(12) United States Patent
Masahiro

(10) Patent No.: US 8,840,812 B2
(45) Date of Patent: Sep. 23, 2014

(54) CONDUCTIVE POLYMER SOLUTION, CONDUCTIVE COATING FILM, AND INPUT DEVICE

(75) Inventor: Yasushi Masahiro, Saitama (JP)

(73) Assignee: Shin-Etsu Polymer Co., Ltd. (JP)

( * ) Notice: Subject to any disclaimer, the term of this patent is extended or adjusted under 35 U.S.C. 154(b) by 360 days.

(21) Appl. No.: 12/681,207

(22) PCT Filed: Oct. 3, 2008

(86) PCT No.: PCT/JP2008/068103
§ 371 (c)(1),
(2), (4) Date: Apr. 1, 2010

(87) PCT Pub. No.: WO2009/044894
PCT Pub. Date: Apr. 9, 2009

(65) Prior Publication Data
US 2010/0252782 A1    Oct. 7, 2010

(30) Foreign Application Priority Data

Oct. 5, 2007  (JP) .................. 2007-261983
Oct. 5, 2007  (JP) .................. 2007-261984
Oct. 5, 2007  (JP) .................. 2007-261985
Oct. 5, 2007  (JP) .................. 2007-261986
Dec. 19, 2007 (JP) .................. 2007-327624

(51) Int. Cl.
*H01B 1/02* (2006.01)
*H01B 1/12* (2006.01)
*C09D 5/24* (2006.01)
*C09D 7/12* (2006.01)
*H05B 33/28* (2006.01)
*H01B 1/24* (2006.01)
*C09D 125/18* (2006.01)
*C09D 5/38* (2006.01)
*C08K 3/22* (2006.01)

(52) U.S. Cl.
CPC .. *H01B 1/24* (2013.01); *C09D 5/24* (2013.01); *C08K 3/22* (2013.01); *C09D 7/1216* (2013.01); *H05B 33/28* (2013.01); *C09D 125/18* (2013.01); *C09D 5/38* (2013.01); *H01B 1/127* (2013.01)
USPC ........... 252/511; 252/513; 252/514; 252/512; 252/519.34; 252/519.33

(58) Field of Classification Search
CPC .................................. H01B 1/02; H01B 1/12
See application file for complete search history.

(56) References Cited

U.S. PATENT DOCUMENTS

| | | | |
|---|---|---|---|
| 2004/0242792 A1* | 12/2004 | Sotzing ...................... 525/326.1 |
| 2006/0110580 A1* | 5/2006 | Aylward et al. ............... 428/172 |
| 2007/0096066 A1 | 5/2007 | Yoshida et al. ............... 252/511 |

FOREIGN PATENT DOCUMENTS

| | | |
|---|---|---|
| EP | 1 947 655 | 7/2008 |
| JP | 61-287941 | 12/1986 |

(Continued)

OTHER PUBLICATIONS

Citing to Maeda et al, Surface Modifiers, 1984, in Pharaceutical Suspensions: From formulation Development to Manufacturing, Screen capture p. 154.*

(Continued)

*Primary Examiner* — Randy Gulakowski
*Assistant Examiner* — Jeffrey Washville
(74) *Attorney, Agent, or Firm* — Ostrolenk Faber LLP

(57) ABSTRACT

The conductive polymer solution of the present invention contains a π-conjugated conductive polymer, polyanions and a solvent, at least one of specific metal ions, silver halide, conductive carbon black and conductive metal oxide particles, and a reducing agent and/or neutralizing agent as necessary. The conductive polymer solution of the present invention can be used a conductive coating film having both superior transparency and being suitable for use a transparent electrode of a touch panel electrode sheet. In addition, the conductive coating film of the present invention has superior transparency that enables it to be used as a transparent electrode of a touch panel electrode sheet.

8 Claims, 2 Drawing Sheets

(56) References Cited

FOREIGN PATENT DOCUMENTS

| | | |
|---|---|---|
| JP | 01-217043 | 8/1989 |
| JP | 5-105828 A | 4/1993 |
| JP | 6-207012 | 7/1994 |
| JP | 11-105182 | 4/1999 |
| JP | 2000-123658 | 4/2000 |
| JP | 2002-241383 | 8/2002 |
| JP | 2004-131806 | 4/2004 |
| JP | 2004-256702 A | 9/2004 |
| JP | 2005-97499 A | 4/2005 |
| JP | 2005-146259 A | 6/2005 |
| JP | 2005-166502 A | 6/2005 |
| JP | 2005-327910 | 11/2005 |
| JP | 2006-286418 | 10/2006 |
| JP | 2006-291133 A | 10/2006 |
| JP | 2007-45932 A | 2/2007 |
| JP | 2007-080541 | 3/2007 |
| JP | 2007-095408 | 4/2007 |
| JP | 2007-172984 | 7/2007 |
| JP | 2007-211215 A | 8/2007 |
| JP | 2009-37752 | 2/2009 |
| TW | 200624494 | 7/2006 |
| WO | WO 2007/037292 | 4/2007 |

OTHER PUBLICATIONS

International Search Report dated Jan. 20, 2009, issued in corresponding international application No. PCT/JP2008/068103.

European Search Report dated Mar. 9, 2011, issued in corresponding European Application No. EP 08835122.6 (12 pages).

Notice of Allowance dated Aug. 21, 2012 issued in corresponding Japanese Patent Application No. 2007-261986 with English translation (6 pages).

Office Action dated Aug. 21, 2012 issued in corresponding Japanese Patent Application No. 2007-261983 with English translation (4 pages).

Office Action dated Aug. 21, 2012 issued in corresponding Japanese Patent Application No. 2007-327624 with English translation (4 pages).

Japanese Office Action, dated Jan. 8, 2013, issued in corresponding Japanese Patent Application No. 2007-261985, including English translation. Total 6 pages.

Japanese Notice of Allowance, dated Feb. 26, 2013, issued in corresponding Japanese Patent Application No. 2007-327624, including English translation. Total 6 pages.

Examination Report dated Jun. 25, 2012 issued in corresponding Taiwan Patent Application No. 097138071 with English translation (9 pages).

* cited by examiner

CONDUCTIVE POLYMER SOLUTION, CONDUCTIVE COATING FILM, AND INPUT DEVICE

CROSS REFERENCE TO RELATED APPLICATIONS

The present application is a 35 U.S.C. §371 National Phase conversion of PCT/JP2008/068103, filed Oct. 3, 2008, which claims benefit of Japanese Patent Application No. 2007-261983, filed on Oct. 5, 2007, Japanese Patent Application No. 2007-261984, filed on Oct. 5, 2007, Japanese Patent Application No. 2007-261985, filed on Oct. 5, 2007, Japanese Patent Application No. 2007-261986, filed on Oct. 5, 2007, and Japanese Patent Application No. 2007-327624, filed on Dec. 19, 2007, the contents of which are incorporated herein by reference. The PCT International Application was published in the Japanese language.

TECHNICAL FIELD

The present invention relates to a conductive polymer solution for forming a conductive coating film for a transparent electrode, and a conductive coating film preferable for use as a transparent electrode of an input device. Moreover, the present invention also relates to an input device such as a touch panel.

BACKGROUND ART

Touch panels are input devices installed on image display devices in which at least a portion thereof that overlaps with the image display device is transparent.

A known example of a touch panel is a resistive film type touch panel. In a resistive film type touch panel, a stationary electrode sheet and a movable electrode sheet, in which a transparent electrode is formed on one side of a transparent base, are arranged so that the transparent electrodes are mutually opposed. An indium-doped tin oxide film (to be referred to as an ITO film) has widely been used for the transparent electrode of these electrode sheets.

A sheet in which an ITO film is formed on one side of a transparent base (to be referred to as an ITO film forming sheet) has low flexibility and is easily immobilized, thereby making it preferable for use as a stationary electrode sheet of an image display device. However, in the case of using as a movable electrode sheet on the side of an input operator of a touch panel, it had the problem of low durability during repeated deflection.

Therefore, a flexible sheet in which is formed a conductive coating film containing a π-conjugated conductive polymer (to be referred to as a conductive polymer film forming sheet) is used on one side of a transparent base as a movable electrode sheet on the side of an input operator of a touch panel.

However, in the case of using an ITO film forming sheet as a stationary electrode sheet on the side of an image display device and using a conductive polymer forming sheet as a movable electrode sheet on the side of a key operator of a touch panel, namely in the case of connecting mutually different conductors, contact resistance increased resulting in problems such as decreased input sensitivity and delays in coordinate input time.

In order to solve these problems, Patent Document 1 proposes the addition of metal ions to a conductive coating film containing a π-conjugated conductive polymer. In addition, Patent Document 4 proposes the addition of a conductive metal oxide in the form of indium oxide or tin oxide to an aqueous solution containing a π-conjugated conductive polymer and polyanions followed by coating the resulting solution onto a transparent base to form a transparent electrode.

In addition, the addition of metal particles to a conductive coating film containing π-conjugated conductive polymer has also been devised. Examples of electrode sheets in which metal particles have been added to a conductive coating film containing a π-conjugated conductive polymer are disclosed in Patent Documents 2 and 3.

[Patent Document 1] Japanese Laid-Open Patent Application No. 2007-172984
[Patent Document 2] Japanese Laid-Open Patent Application No. 2005-327910
[Patent Document 3] Japanese Laid-Open Patent Application No. 2007-080541
[Patent Document 4] Japanese Laid-Open Patent Application No. 2006-286418

DISCLOSURE OF THE INVENTION

Problems to be Solved by the Invention

However, in the electrode sheets described in Patent Document 1 and Patent Document 4, contact resistance with respect to the ITO film was not small enough.

In addition, in the electrode sheets described in Patent Documents 2 and 3, since transparency was low and decreases in contact resistance were not uniform, they were not necessarily suitable for use in touch panels.

Thus, in the case of applying the electrode sheets described in Patent Documents 1 to 4 to a resistive film type touch panel, there were the risks of decreased visibility of images on the image display device, decreased input sensitivity or delays in coordinate input time when the sheets were installed on an image display device.

In addition, although electrostatic capacitive type touch panels are also known as a type of touch panel, in the case of applying the electrode sheets described in Patent Documents 1 to 4 to the transparent electrodes thereof as well, image visibility decreased or malfunctions occurred. Moreover, since touch panels are required to allow images of an image display device to be viewed distinctly, electrode sheets used therein are required to have high transparency.

Thus, the electrode sheets described in Patent Documents 1 to 4 were not suitable for use in touch panels.

With the foregoing in view, an object of the present invention is to provide a conductive polymer solution capable of forming a conductive coating film having both superior transparency and being suitable for use a transparent electrode of a touch panel electrode sheet.

In addition, an object of the present invention is to provide a conductive coating film having superior transparency and being suitable for use as a transparent electrode of a touch panel electrode sheet.

In addition, an object of the present invention is to provide an input device that has superior visibility of images of an image display device when installed on an image display device while also preventing malfunctions.

Means for Solving the Problems

As a result of investigations by the inventor of the present invention, it was determined that contact resistance with respect to an ITO film does not decrease even if metal ions are contained in a conductive coating film, and that contact resistance with respect to an ITO film does not decrease even if conductive metal oxide particles are added to an aqueous solution of a conductive polymer since conductive metal oxide particles easily dissolve in an acidic aqueous solution. As a result of additionally conducting studies on a technique for ensuring transparency while containing metal particles or conductive metal oxide particles in a conductive coating film, the following inventions of a conductive polymer solution, a conductive coating film and an input device were able to be completed.

[1] A conductive polymer solution, comprising: alt-conjugated conductive polymer, polyanion, metal ions and a reducing agent; wherein, the metal that forms the metal ions is one or more type of metals selected from the group consisting of nickel, copper, silver, gold, platinum and palladium, and the content of metal ions is 0.001 to 50% by weight based on a value of 100% for the total amount of the π-conjugated conductive polymer and the polyanion.

[2] The conductive polymer solution described in [1] above, further containing one or both of a (meth)acrylamide compound and/or polyfunctional acrylic compound.

[3] A conductive coating film, which is formed by coating the conductive polymer solution described in [1] or [2] above.

[4] An input device, which is provided with a transparent electrode composed of the conductive coating film described in [3] above.

[5] A conductive polymer solution, comprising: alt-conjugated conductive polymer, polyanion, silver halide and a solvent; wherein, the content of silver that composes the silver halide is 0.001 to 50% by weight based on a value of 100% for the total amount of the π-conjugated conductive polymer and the polyanion.

[6] The conductive polymer solution described in [5] above, further containing a reducing agent.

[7] The conductive polymer solution described in [5] or [6] above, further containing one or both of a (meth)acrylamide compound and/or a polyfunctional acrylic compound.

[8] A conductive coating film, which is formed by coating the conductive polymer solution described in any of [5] to [7] above followed by reduction treatment.

[9] An input device, which is provided with a transparent electrode composed of the conductive coating film described in [8] above.

[10] A conductive polymer solution, comprising: alt-conjugated conductive polymer, polyanion, conductive carbon black and a solvent; wherein, the content of the conductive carbon black is 0.01 to 10% by weight based on a value of 100% for the total amount of the π-conjugated conductive polymer and the polyanion.

[11] The conductive polymer solution described in [10] above, further containing a surfactant.

[12] The conductive polymer solution described in [10] or [11] above, further containing one or both of a (meth)acrylamide compound and/or a polyfunctional acrylic compound.

[13] A conductive coating film, which is formed by coating the conductive polymer solution described in any of [10] to [12] above.

[14] An input device, which is provided with a transparent electrode composed of the conductive coating film described in [13] above.

[15] A conductive polymer solution, comprising: alt-conjugated conductive polymer, polyanion, conductive metal oxide particles, a neutralizing agent and water; wherein, the content of the conductive metal oxide particles is 0.01 to 50% by weight based on a value of 100% for the total amount of the π-conjugated conductive polymer and the polyanion.

[16] The conductive polymer solution described in [15] above, wherein the conductive metal oxide particles are particles of one or more types of metal oxides selected from the group consisting of tin oxide, indium oxide, antimony pentoxide and zinc oxide.

[17] The conductive polymer solution described in [15] or [16] above, wherein the neutralizing agent is one or more types of organic bases selected from the group consisting of aliphatic amines, aromatic amines, quaternary amines and metal alkoxides.

[18] The conductive polymer solution described in any of [15] to [17] above, further containing one or both of a (meth)acrylamide compound and/or a polyfunctional acrylic compound.

[19] A conductive coating film, which is formed by coating the conductive polymer solution described in any of [15] to [18] above.

[20] An input device, which is provided with a transparent electrode composed of the conductive coating film described in [19] above.

Effects of the Invention

According to the conductive polymer solution of the present invention, a conductive coating film can be formed that has superior transparency and is suitable for used as a transparent electrode of a touch panel electrode sheet.

The conductive coating film of the present invention has superior transparency and is suitable for use as a transparent electrode of a touch panel electrode sheet.

The input device of the present invention has superior visibility of images of an image display device when installed on an image display device and prevents malfunctions.

Figure 1:
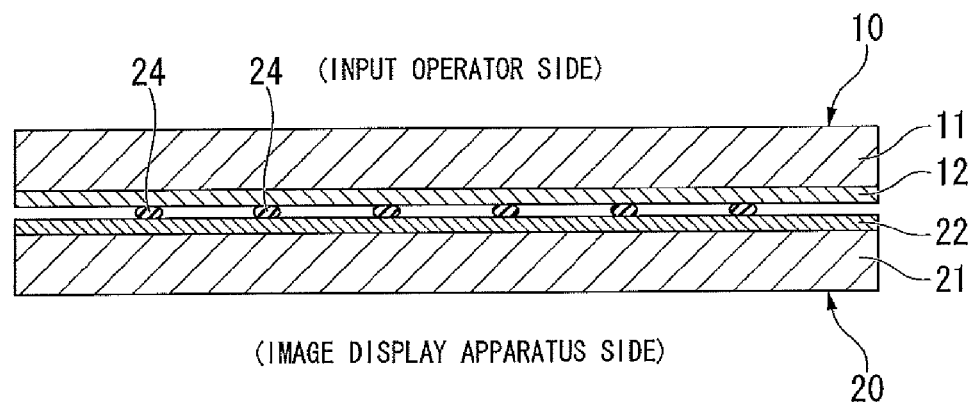
FIG. 1 is a cross-sectional view showing an example of an input device of the present invention.

| BRIEF DESCRIPTION OF THE REFERENCE SYMBOLS | |
|---|---|
| 10 | Movable electrode sheet |
| 11 | Transparent base |
| 12 | Conductive coating film |
| 13a, 13b | Electrode wiring |
| 20 | Stationary electrode sheet |
| 21 | Transparent base |
| 22 | ITO film |
| 23a, 23b | Electrode wiring |
| 24 | Dot spacer |

BEST MODE FOR CARRYING OUT THE INVENTION

Conductive Polymer Solution

The conductive polymer solution of the present invention contains a π-conjugated conductive polymer, polyanions and a solvent, at least one of specific metal ions, silver halide, conductive carbon black and conductive metal oxide particles, and a reducing agent and/or neutralizing agent as necessary.

(π-Conjugated Conductive Polymer)

There are no particular limitations on the π-conjugated conductive polymer provided it is an organic polymer in which the main chain is composed of a π-conjugated system, examples of which include polypyrroles, polythiophenes, polyacetylenes, polyphenylenes, polyphenylenevinylenes, polyanilines, polyacenes, polythiophenevinylenes and copolymers thereof. In consideration of stability in air, polypyrroles, polythiophenes and polyanilines are preferable.

Although the π-conjugated conductive polymer allows the obtaining of adequate electrical conductivity and compatibility with binder resin even if allowed to remain unsubstituted, in order to further enhance electrical conductivity and compatibility, a functional group such as an alkyl group, carboxy group, sulfo group, alkoxy group or hydroxy group is preferably introduced into the π-conjugated conductive polymer.

Specific examples of π-conjugated conductive polymers include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-methyl-4-hexyloxypyrrole), poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3-methyl-4-methoxythiophene), poly(3,4-ethylenedioxythiophene), (poly-3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonicacid) andpoly(3-anilinesulfonicacid). Among these, poly(3,4-ethylenedioxythiophene) is preferable in terms of electrical conductivity and heat resistance.

(Polyanions)

Examples of polyanions include optionally substituted polyalkylenes, optionally substituted polyalkenylenes, optionally substituted polyimides, optionally substituted polyamides and optionally substituted polyesters, which are polymers that are composed only of constituent units having an anionic group or polymers composed of constituent units having an anionic group and constituent units not having an anionic group.

Polyalkylenes refer to polymers in which the main chain is composed of repeating methylene groups.

Polyalkenylenes refer to polymers composed of constituent units in which a single unsaturated double bond (vinyl group) is contained in the main chain.

Examples of polyimides include polyimides composed of acid anhydrides such as pyromellitic dianhydride, biphenyltetracarboxylic dianhydride or 2,2'-[4,4'-di(dicarboxyphenyloxy)phenyl]propane dianhydride, and diamines such as oxydiamine, paraphenylenediamine, metaphenylenediamine or benzophenonediamine.

Examples of polyamides include polyamide 6, polyamide 6,6 and polyamide 6,10.

Examples of polyesters include polyethylene terephthalate and polybutylene terephthalate.

In the case the polyanion has a substituent, examples of the substituent include an alkyl group, hydroxy group, amino group, carboxy group, cyano group, phenyl group, phenol group, ester group and alkoxy group. An alkyl group, hydroxy group, phenol group or ester group is preferable in consideration of solubility in organic solvent, heat resistance and resin compatibility.

Examples of alkyl groups include alkyl groups such as a methyl, ethyl, propyl, butyl, isobutyl, t-butyl, pentyl, hexyl, octyl, decyl or dodecyl group, and cycloalkyl groups such as a cyclopropyl, cyclopentyl or cyclohexyl group.

Examples of hydroxy groups include hydroxy groups bound to the main chain of the polyanion either directly or through another functional group, and examples of other functional groups include alkyl groups having 1 to 7 carbon atoms, alkenyl groups having 2 to 7 carbon atoms, amide groups and imide groups. The hydroxy group is substituted either on the terminal of or within these functional groups.

Examples of amino groups include amino groups bound to the main chain of the polyanion either directly or through another functional group, and examples of other functional groups include alkyl groups having 1 to 7 carbon atoms, alkenyl groups having 2 to 7 carbon atoms, amide groups and imide groups. The amino group is substituted either on the terminal of or within these functional groups.

Examples of phenol groups include phenol groups bound to the main chain of the polyanion either directly or through another functional group, and examples of other functional groups include alkyl groups having 1 to 7 carbon atoms, alkenyl groups having 2 to 7 carbon atoms, amide groups and imide groups. The phenol group is substituted either on the terminal of or within these functional groups.

Examples of polyalkylenes having a substituent include polyethylene, polypropylene, polybutene, polypentene, polyhexene, polyvinyl alcohol, polyvinyl phenol, poly(3,3,3-trifluoropropylene), polyacrylonitrile, polyacrylate and polystyrene.

Specific examples of polyalkenylenes include polymers containing one or more types of constituent units selected from the group consisting of propenylene, 1-methylpropenylene, 1-butylpropenylene, 1-decylpropenylene, 1-cyanopropenylene, 1-phenylpropenylene, 1-hydroxypropenylene, 1-butenylene, 1-methyl-1-butenylene, 1-ethyl-1-butenylene, 1-octyl-1-butenylene, 1-pentadecyl-1-butenylene, 2-methyl-1-butenylene, 2-ethyl-1-butenylene, 2-butyl-1-butenylene, 2-hexyl-1-butenylene, 2-octyl-1-butenylene, 2-decyl-1-butenylene, 2-dodecyl-1-butenylene, 2-phenyl-1-butenylene, 2-butenylene, 1-methyl-2-butenylene, 1-ethyl-2-butenylene, 1-octyl-2-butenylene, 1-pentadecyl-2-butenylene, 2-methyl-2-butenylene, 2-ethyl-2-butenylene, 2-butyl-2-butenylene, 2-hexyl-2-butenylene, 2-octyl-2-butenylene, 2-decyl-2-butenylene, 2-dodecyl-2-butenylene, 2-phenyl-2-butenylene, 2-propylenephenyl-2-butenylene, 3-methyl-2-butenylene, 3-ethyl-2-butenylene, 3-butyl-2-butenylene, 3-hexyl-2-butenylene, 3-octyl-2-butenylene, 3-decyl-2-butenylene, 3-dodecyl-2-butenylene, 3-phenyl-2-butenylene, 3-propylenephenyl-2-butenylene, 2-pentenylene, 4-propyl-2-pentenylene, 4-butyl-2-pentenylene, 4-hexyl-2-pentenylene, 4-cyano-2-pentenylene, 3-methyl-2-pentenylene, 4-ethyl-2-pentenylene, 3-phenyl-2-pentenylene, 4-hydroxy-2-pentenylene and hexenylene.

Examples of anionic groups of the polyanion include —O—$SO_3^-X^+$, —$SO_3^-X^+$ and —$COO^-X^+$ (wherein, $X^+$ in each formula represents a hydrogen ion or alkaline metal ion).

Namely, the polyanion is polymeric acid that contains a sulfo group and/or carboxy group. Among these, —$SO_3^-X^+$ and —$COO^-X^+$ are preferable from the viewpoint of doping effects on the π-conjugated conductive polymer.

In addition, these anionic groups are preferably arranged in the main chain of the polyanion either mutually adjacent or at fixed intervals.

Among the aforementioned polyanions, polyisoprene sulfonic acid, copolymers containing polyisoprene sulfonic acid, polysulfoethylmethacrylate, copolymers containing polysulfoethylmethacrylate, poly(4-sulfobutylmethacrylate), copolymers containing poly(4-sulfobutylmethacrylate), polymethallyl oxybenzene sulfonic acid, copolymers containing polymethallyl oxybenzene sulfonic acid, polystyrene sulfonic acid and copolymers containing polystyrene sulfonic acid.

The degree of polymerization of the polyanion is preferably within the range of 10 to 100,000 monomer units, and more preferably within the range of 50 to 10,000 monomer units from the viewpoints of solvent solubility and electrical conductivity.

The content of the polyanion is preferably within the range of 0.1 to 10 mol, and more preferably within the range of 1 to 7 mol, based on 1 mole of the π-conjugated conductive polymer. If the polyanion content is less than 0.1 mol, doping effects on the π-conjugated conductive polymer tend to weaken resulting in inadequate electrical conductivity. Moreover, dispersibility and solubility in solvent also lowers making it difficult to obtain a homogeneous dispersion. In addition, if the polyanion content exceeds 10 mol, the content of the π-conjugated conductive polymer decreases, again making it difficult to obtain adequate electrical conductivity.

The polyanion is coordinated by the ρ-conjugated conductive polymer. Consequently, the π-conjugated conductive polymer and the polyanion form a complex.

The total content of the π-conjugated conductive polymer and the polyanion in the conductive polymer solution is 0.05 to 5.0% by weight and preferably 0.5 to 4.0% by weight. If the total content of the π-conjugated conductive polymer and the polyanion is less than 0.05% by weight, adequate electrical conductivity may be unable to be obtained, while if the total content exceeds 5.0% by weight, a uniform conductive coating film may be unable to be obtained.

(Metal Ions)

The metals that form the metal ions in the present invention are one or more types of metals selected from the group consisting of nickel, copper, silver, gold, platinum and palladium.

Metal ions are formed by, for example, dissolving a metal salt in water. Here, examples of metal salts include silver carbonate, silver nitrate, silver sulfate, silver acetate, silver nitrite, silver sulfite, silver chlorate, silver perchlorate, silver p-toluenesulfonate, silver 2-methylhexanoate, silver lactate, silver methanesulfonate, silver salicylate, silver behenate, silver stearate, silver oleate, silver laurate, silver capronate, silver myristate, silver palmitate, silver maleate, silver fumarate, silver tartrate, silver valerate, silver furoate, silver linoleate, silver butyrate, silver camphorate, silver benzoate, silver 3,5-dihydrobenzoate, silver o-methylbenzoate, silver m-methylbenzoate, silver p-methylbenzoate, silver 2,4-dichlorobenzoate, silver acetoamidobenzoate, silver p-phenylbenzoate, silver gallate, silver tannate, silver phthalate, silver terephthalate, silver phenylacetate, silver pyromellitate, silver picrate and silver salts of 3-carboxymethyl-4-methyl-4-thiazoline-2-thione; chloroauric acid, potassium chloroaurate and sodium chloroaurate; chloroplatinic acid, platinum chloride and potassium chloroplatinate; palladium nitrate, palladium acetate, palladium chloride and palladium sulfate; copper chloride, copper acetate and copper sulfate; and, nickel chloride, nickel nitrate, nickel perchlorate, nickel sulfate, nickel phosphate, nickel acetate, nickel lactate, nickel oxalate, nickel tartrate and nickel citrate. One type of these metal salts may be used alone or two or more types may be used in combination. Among these metal salts, silver nitrate, silver sulfate, silver acetate or silver p-toluenesulfonate and the like are preferable in consideration of cost and reactivity.

The content of the metal ions is 0.001 to 50% by weight, preferably 0.005 to 40% by weight, and particularly preferably 0.01 to 30% by weight, based on a value of 100% by weight for the total amount of the π-conjugated conductive polymer and the polyanion. If the content of the metal ions is less than 0.001% by weight, a malfunction may occur as a result of failing to sufficiently lower contact resistance during contact of mutually different conductors, while if the metal ion content exceeds 50% by weight, the transparency of a conductive coating film formed from the conductive polymer solution may decrease.

(Silver Halide)

Examples of the silver halide include silver bromide, silver chloride, silver iodide and silver fluoride. One type of these silver halides may be used alone or two or more types may be used in combination.

Among these silver halides, silver bromide, silver chloride and silver iodide are preferable in consideration of cost, reactivity and oxidizing power of the halogen compound formed when reduced.

The content of the silver that composes the silver halide is 0.001 to 50% by weight, preferably 0.005 to 40% by weight and particularly preferably 0.01 to 30% by weight based on a value of 100% by weight for the total amount of the π-conjugated conductive polymer and the polyanion. If the content of silver that composes the silver halide is less than 0.001% by weight, a malfunction may occur as a result of failing to sufficiently lower contact resistance during contact of mutually different conductors, while if the silver content exceeds 50% by weight, the transparency of a conductive coating film formed from the conductive polymer solution may decrease.

(Conductive Carbon Black)

Although examples of conductive carbon black include furnace black, acetylene black and channel black, furnace black is preferable from the viewpoint of electrical conductivity.

In addition, since conductive carbon black improves dispersibility in water, it is preferably hydrophilized by having carboxy groups present on the surface thereof.

Since carbon black has a carbon framework, it demonstrates superior stability in environments with high temperature and humidity levels. In addition, since it also demonstrates superior absorption of ultraviolet rays, ultraviolet deterioration can be prevented by containing carbon black in a coating film.

The mean particle diameter of the conductive carbon black is preferably 0.01 to 0.5 μm.

Handling ease is superior if the mean particle diameter of the conductive carbon black is 0.01 μm or more, while dispersibility in the conductive carbon black can be easily enhanced if the mean particle diameter is 0.5 μm or less.

The content of the conductive carbon black is 0.01 to 10% by weight, preferably 0.01 to 8.0% by weight and particularly preferably 0.01 to 5.0% by weight based on a value of 100% by weight for the total amount of the π-conjugated conductive polymer and the polyanion. If the content of the conductive carbon black is less than 0.01% by weight, a malfunction may occur as a result of failing to sufficiently lower contact resistance during contact of mutually different conductors, while if the silver content exceeds 10% by weight, the transparency of a conductive coating film formed from the conductive polymer solution may decrease.

The conductive polymer solution preferably contains a surfactant to improve dispersibility of the conductive carbon black.

Examples of surfactants that can be used for the surfactant include nonionic surfactants, anionic surfactants and cationic surfactants.

Examples of nonionic surfactants include polyethylene glycol-type nonionic surfactants such as higher alcohol ethylene oxide addition products, alkyl phenol ethylene oxide addition products, fatty acid ethylene oxide addition products, higher alcohol fatty acid ester ethylene oxide addition products, fatty acid amide ethylene oxide addition products, ethylene oxide addition products of fats and oils or polypropylene glycol ethylene oxide addition products; and polyvalent alcohol-type nonionic surfactants such as fatty acid esters of glycerol, fatty acid esters of pentaerythritol, fatty acid esters of sorbitol and sorbitan fatty acid esters of sucrose, alkyl ethers of polyvalent alcohols or fatty acid amides of alkanol amines.

Examples of anionic surfactants include sulfuric acid ester salt-based, sulfonic acid ester salt-based, phosphoric acid ester-based and soap-based anionic surfactants. Specific examples include sodium dodecylbenzene sulfonate, sodium dodecyl sulfate, sodium alkylnaphthalene sulfonate and sodium dialkyl sulfosuccinate.

Examples of cationic surfactants include amine salt-based and quaternary ammonium salt-based cationic surfactants. Specific examples include alkyl benzene dimethyl ammonium chloride, alkyl trimethyl ammonium chloride and distearyl ammonium chloride.

(Conductive Metal Oxide Particles)

Examples of components of the conductive metal oxide particles include tin oxide, tin oxides doped with one or more elements selected from the group consisting of antimony, zinc and fluorine, indium oxide, indium oxides doped with one or more elements selected from the group consisting of tin, zinc, tellurium, silver, gallium, zirconium, hafnium and magnesium, antimony pentoxide, zinc oxide and zinc oxide doped with one or more elements selected from the group consisting of aluminum, gallium, indium, boron, fluorine and manganese.

Among these conductive metal oxide particles, one or more types of metal oxides selected from the group consisting of tin oxide, indium oxide, antimony pentoxide and zinc oxide are preferable since they are capable of easily improving electrical conductivity.

The mean particle diameter of the conductive metal oxide particles is preferably 0.01 to 20 μm. Handling ease is superior if the mean particle diameter of the conductive metal oxide particles is 0.01 μm or more, while dispersibility in the conductive metal oxide particles can be easily enhanced if the mean particle diameter is 20 μm or less.

The content of the conductive metal oxide particles is 0.01 to 50% by weight, preferably 0.02 to 40% by weight and particularly preferably 0.05 to 30% by weight based on a value of 100% by weight for the total amount of the π-conjugated conductive polymer and the polyanion. If the content of the conductive metal oxide particles is less than 0.01% by weight, a malfunction may occur as a result of failing to sufficiently lower contact resistance during contact of mutually different conductors, while if the content exceeds 50% by weight, the transparency of a conductive coating film formed from the conductive polymer solution may decrease.

In the case the conductive polymer solution contains a surfactant, a neutralizing agent that neutralizes the acidity of the polyanion is preferably contained in order to improve the stability of the surfactant.

Examples of neutralizing agents include inorganic bases and organic bases.

Examples or inorganic bases include sodium hydroxide, potassium hydroxide, calcium hydroxide and ammonia.

Examples of organic bases include aliphatic amines, aromatic amines, quaternary amines and metal alkoxides.

Examples of aliphatic amines include ethylamine, propylamine, butylamine, hexylamine, octylamine, stearylamine, diethylamine, dipropylamine, dibutylamine, dioctylamine, methylethylamine, triethylamine, tripropylamine and tributylamine.

Examples of aromatic amines include aniline, benzylamine, pyrrole, pyridine and derivatives thereof, imidazole and derivatives thereof, pyrimidine and derivatives thereof, pyrazine and derivatives thereof, and triazine and derivatives thereof. Among these, pyridine and derivatives thereof, imidazole and derivatives thereof, pyrimidine and derivatives thereof, pyrazine and derivatives thereof and triazine and derivatives thereof function also as electrical conductivity improvers.

Examples of quaternary amines include tetraethylammonium hydroxide, tetrapropylammonium hydroxide, tetrabutylammonium hydroxide, tetrahexylammonium hydroxide and tetraoctylammonium hydroxide.

Examples of nitrogen-containing compounds other than amines include N-methyl-pyrrolidone, N,N-dimethylformamide, N,N-dimethylacetoamide, hexamethylene phosphoryl triamide, N-vinylpyrrolidone, N-vinylformamide and N-vinylacetoamide.

Examples of metal alkoxides include sodium alkoxides such as sodium methoxide or sodium ethoxide, potassium alkoxides and calcium alkoxides.

Among these neutralizing agents, an organic base composed of one or more types of components selected from the group consisting of aliphatic amines, aromatic amines, quaternary amines and metal alkoxides is preferable.

The conductive polymer solution is neutralized as a result of containing the neutralizing agent. More specifically, the pH of the conductive polymer solution (when measured at 25° C.) is preferably 4 to 10 and more preferably 5 to 9. If the pH is lower than 4, the solution becomes excessively acidic which may prevent the dispersibility of the conductive carbon black from being improved due to destabilization of the surfactant, while the conductive metal oxide particles may be prevented from dissolving. If the respective pH values exceed 10, it may become difficult to form a coating film or even if a coating film is formed, electrical conductivity may decrease.

(Reducing Agent)

The reducing agent is a chemical that reduces the aforementioned metal ions to metal, and a reducing agent is preferably contained in the conductive polymer solution for the purpose of enabling silver particles to be easily formed from the silver halide.

There are no particular limitations on the reducing agent, and examples include amine compounds (such as dimethylaminoethanol, methyldiethanolamine, triethanolamine, phenidone or hydrazine), hydrogen compounds (such as sodium borohydride, lithium borohydride, hydrogen iodide or hydrogen gas), oxides (such as carbon monoxide or sulfur dioxide), low atomic number metal salts (such as ferrous sulfate, iron oxide, iron fumarate, iron lactate, iron oxalate, iron sulfide, tin acetate, tin chloride, tin diphosphate, tin oxalate, tin oxide or tin sulfate), phenol-based compounds (such as hydroquinone, pyrogallol, tannin or tannic acid), sugars (such as D-glucose), vitamins (such as ascorbic acid), hydroxy-based compounds (such as glycol), benzotriazole-based compounds (such as 2-(2'-dihydroxy-4'-m-octoxyphenylbenzotriazole), benzophenone-based compounds (such as 2,2'-dihydroxybenzophenone, 2,4-dihydroxybenzophenone, 2,4'-dihydroxybenzophenone, 4,4'-dihydroxybenzophenone, 2,4,4'-trihydroxybenzophenone, 3,4,5-trihydroxybenzophenone, 2,3,4-trihydroxybenzophenone, 2,3,4,4'-tetrahydroxybenzophenone, 2,3',4,4'-tetrahydroxybenzophenone, 2,2'-dihydroxy-4-methoxy-benzophenone, 2,3,3',4,4',5'-hexahydroxybenzophenone, 2-hydroxybenzophenone, 4-hydroxybenzophenone, 2-hydroxyacetophenone, 4-hydroxyacetophenone, 3,4,5-trihydroxyacetophenone, 2-hydroxybenzaldehyde, 4-hydroxybenzaldehyde, 3,4,5-trihydroxybenzaldehyde, 2-hydroxybenzoic acid, 4-hydroxybenzoic acid, 3,4,5-trihydroxybenzoic acid, methyl 2-hydroxybenzoate, methyl 4-hydroxybenzoate, methyl 3,4,5-trihydroxybenzoate, phenyl 4-hydroxybenzoate, 2-hydroxybenzamide, 3-acetoamidophenol, 4-acetoamidophenol, N-phenylbenzamide, hydroxyphenyl methacrylamide, hydroxyphenyl diethylamide, 4-hydroxybenzamide or 3,4,5-trihydroxybenzamide), salicylate-based compounds (such as p-t-butylphenyl salicylate or salicylic acid), and amide compounds (such as formaldehyde). One type of these reducing agents may be used alone or two or more types may be used in combination. Among the aforementioned reducing agents, phenol-based compounds, sugars, vitamins, benzophenone-based compounds, hydroxy-based compounds and salicylate-based compounds are preferable, and benzophenone-based compounds are more preferable, since they improve solubility in the conductive polymer solution, solution stability, reducibility as well as light resistance of the π-conjugated conductive polymer and the polyanion.

The content of the reducing agent required to reduce the metal ions is preferably 0.1% by weight or more of the amount required to reduce the metal ions. If the content thereof is less than this amount, there is the risk of reduction being inadequate. In addition, the content of the reducing agent is preferably 1000% by weight or less the amount required to reduce the metal ions. This is because, since reducibility of the metal ions does not change even if the reducing agent is contained in excess of 1000% by weight, addition in an amount greater than this would not be beneficial.

On the other hand, the amount of the reducing agent required to reduce the silver halide is preferably 0.1% by weight or more based on a value of 100% by weight of the amount of silver that composes the silver halide. If the content of the reducing agent is less than 0.1% by weight based on a value of 100% by weight for the amount of silver that composes the silver halide, there is the risk of reduction being inadequate. In addition, the content of the reducing agent is preferably 10000% by weight or less based on a value of 100% by weight for the amount of silver that composes the silver halide. This is because, since reducibility of the silver halide does not change even if the reducing agent is contained in excess of 10000% by weight, addition in an amount greater than this would not be beneficial.

(Solvent)

There are no particular limitations on the solvent of the metal ions, silver halide or conductive metal oxide particles, and examples thereof include water, alcohols such as methanol, ethanol, propanol or butanol, carbonate compounds such as ethylene carbonate or propylene carbonate, phenols such as cresol, phenol or xylitol, ketones such as acetone or methyl ethyl ketone, hydrocarbons such as hexane, benzene or toluene, ethers such as dioxane, 2-methyltetrahydrofuran or diethyl ether, nitrile compounds such as acetonitrile, glutarodinitrile, methoxyacetonitrile, propionitrile or benzonitrile, N,N-dimethylformamide, N,N-dimethylacetoamide, N-methyl-2-pyrrolidone, hexamethylene phosphoryl triamide, 1,3-dimethyl-2-imidazolidine, dimethylimidazoline, ethyl acetate, dimethylsulfoxide, sulfolane and diphenylsulfonic acid. These solvents may be used alone, two or more types may be used as a mixture or they may be used as mixture with other organic solvents.

Among these solvents, water and alcohols are preferable due to their handling ease.

On the other hand, although there are no particular limitations on the solvent of the conductive carbon black, an aqueous solvent is preferable in the case of containing a surfactant.

Examples of aqueous solvents include water and alcohols such as ethylene glycol, diethylene glycol, triethylene glycol, polyethylene glycol, glycerin, propylene glycol, polyglycerin, 1,2-butandiol, 1,3-butanediol, 1,4-butanediol or 2,3-butanediol. One type of these solvents may be used alone or two or more types may be used in combination.

(Acrylic Compound)

An acrylic compound is preferably contained since the film forming ability of the conductive polymer solution is improved. Here, the acrylic compound refers to a compound described in (a) below, a compound described in (b) below or a polyfunctional acrylic compound:

(a) acrylic compound having a glycidyl group (to be referred to as compound (a)); and, (b) acrylic compound having one type of group selected from the group consisting of an allyl group, vinyl ether group, methacrylic group, acrylic group, methacrylamide group and acrylamide group, and a hydroxy group (to be referred to as compound (b)).

Moreover, examples of the compound (a) include the following acrylic compounds described in (a-1) to (a-3) below:

(a-1) acrylic compound having one type of group selected from the group consisting of a glycidyl group, allyl group, vinyl ether group, methacrylic group, acrylic group, methacrylamide group and acrylamide group (to be referred to as compound (a-1));

(a-2) acrylic compound having two or more glycidyl groups (to be referred to as compound (a-2)); and, (a-3) acrylic compound having one glycidyl group other than a compound of compound (a-1) (to be referred to as compound (a-3)).

Examples of compound (a-1) having a glycidyl group and an acrylic (methacrylic) group include glycidyl acrylate and glycidyl methacrylate.

Examples of compounds having a glycidyl group and an allyl group include 2-methyl allyl glycidyl ether, allylphenol glycidyl ether and glycerin diglycidyl ether.

Examples of compounds having a glycidyl group and a hydroxy group include 1,4-dihydroxymethylbenzene diglycidyl ether and glycerin diglycidyl ether.

Examples of compounds having a glycidyl group, hydroxy group and allyl group include 3-allyl-1,4-dihydroxymethylbenzene diglycidyl ether.

Furthermore, compounds having a glycidyl group and a hydroxy group as well as compounds having a glycidyl group, hydroxy group and allyl group are also compounds of compound (b).

Examples of compound (a-2) include ethylene glycol diglycidyl ether, diethylene glycol diglycidyl ether, 1,6-hexanediol diglycidyl ether, trimethylolpropane triglycidyl ether, bisphenol A diglycidyl ether, polyethylene glycol diglycidyl ether, propylene glycol diglycidyl ether, polypropylene glycol diglycidyl ether, neopentyl glycol diglycidyl ether, dimer acid diglycidyl ester, diglycidyl phthalate, triglycidyl isocyanurate, tetraglycidyl diaminodiphenyl methane and diglycidyl tetraphthalate, and one type may be used or two or more types may be used as a mixture.

Examples of compound (a-3) include alkyl glycidyl ether, ethylene glycol glycidyl ether, methyl glycidyl ether, phenyl glycidyl ether, butylphenyl glycidyl ether and cresyl glycidyl ether.

Examples of compound (b) having a hydroxy group and a vinyl ether group include 2-hydroxyethyl vinyl ether, 4-hydroxybutyl vinyl ether and diethylene glycol monovinyl ether.

Examples of compounds having a hydroxy group and an acrylic (methacrylic) group include 2-hydroxyethyl acrylate (methacrylate), 2-hydroxypropyl acrylate (methacrylate), 4-hydroxybutyl acrylate (methacrylate), ethyl-α-hydroxymethyl acrylate and dipentaerythritol monohydroxypentaacrylate.

Examples of compounds having a hydroxy group and an acrylamide(methacrylamide) group include 2-hydroxyethyl acrylamide and 2-hydroxyethyl methacrylamide.

The glycidyl group of the aforementioned compound (a) reacts with a residual anionic group of the polyanion (such as a sulfo group or carboxy group) to form an ester (such as a sulfonic acid ester or carboxylic acid ester). The reaction at that time may be accelerated by a basic catalyst, increased pressure or heating. During ester formation, the glycidyl group forms a hydroxy group by undergoing ring opening. This hydroxy group causes a dehydration reaction with residual anionic groups that did not form a salt of the conductive polymer or ester, resulting in the formation of a new ester (such as a sulfonic acid ester or carboxylic acid ester). This ester formation causes complex crosslinking between the polyanion dopant and the conductive polymer.

Moreover, after bonding between residual anionic groups of the polyanion and the glycidyl group of compound (a-1) in the compound (a-1), allyl groups, vinyl ether groups, methacrylic groups, acrylic groups, methacrylamide groups or acrylamide groups of the compound (a-1) polymerize resulting in further complex crosslinking.

In addition, in the aforementioned compound (b), the hydroxy group thereof undergoes a dehydration reaction with residual anionic groups of the polyanion resulting in the formation of ester. During this dehydration reaction, the reaction may be accelerated with an acidic catalyst. Subsequently, allyl groups, vinyl ether groups, methacrylic groups, acrylic groups, methacrylamide groups or acrylamide groups of the compound (b) polymerize. Complexes of the polyanion and conductive polymer crosslink as a result of this polymerization.

Examples of (meth)acrylamide compounds include 2-hydroxyethylacrylamide and 2-hydroxyethylmethacrylamide. Polymers of (meth)acrylamide compounds are able to improve compatibility between complexes of the π-conjugated conductive polymer and the polyanion while also improving electrical conductivity.

Polyfunctional acrylic compounds are acrylic compounds having two or more unsaturated double bonds. The containing of a polyfunctional acrylic compound facilitates crosslinking between complexes of the π-conjugated conductive polymer and the polyanion during coating film formation, while also improving electrical conductivity and coating film strength.

Specific examples of polyfunctional acrylic compounds include bifunctional acrylic monomers such as dipropylene glycol di(meth)acrylate, 1,6-hexandiol di(meth)acrylate, tripropylene glycol di(meth)acrylate, modified bisphenol A di(meth)acrylate, dimethylol dicyclopentane di(meth)acrylate, polyethylene glycol (PEG) 400 di(meth)acrylate, PEG 300 di(meth)acrylate, PEG 600 di(meth)acrylate or N,N'-methylene bisacrylamide, trifunctional acrylic monomers such as trimethylolpropane tri(meth)acrylate, trimethylolpropane tri(meth)acrylate, trimethylolpropane ethoxytri(meth)acrylate, glycerin propoxytri(meth)acrylate, pentaerythritol tri(meth)acrylate or ethoxified glycerin triacrylate, tetrafunctional or greater acrylic monomers such as pentaerythritol ethoxytetra(meth)acrylate, ditrimethylolpropane tetra(meth)acrylate, pentaerythritol tetra(meth)acrylate, dipentaerythritol hexa(penta)(meth)acrylate or dipentaerythritol monohydroxypenta(meth)acrylate, pentafunctional or greater acrylic monomers such as sorbitol pentaacrylate or dipentaerythritol pentaacrylate, hexafunctional or greater acrylic monomers such as dipentaerythritol hexaacrylate, sorbitol hexaacrylate, alkylene oxide-modified hexaacrylate or caprolactone-modified dipentaerythritol hexaacrylate, and bifunctional or greater urethane acrylates.

Among the polyfunctional acrylic compounds, polyfunctional acrylic monomers preferably have a molecular weight of 3000 or less. Polyfunctional acrylic monomers having a molecular weight in excess of 3000 have decreased solvent solubility. In addition, since the unsaturated double bond equivalent decreases, it becomes difficult to crosslink complexes and adequate strength tends to be unable to be obtained following conductive coating film formation.

In addition, among the polyfunctional acrylic compounds, polyfunctional urethane acrylates preferably have a molecular weight of 1000 or less in terms of solvent solubility, wear resistance and low shrinkage. Polyfunctional urethane acrylates having a molecular weight in excess of 1000 have a reduced rate of introduction of urethane groups formed by isocyanate groups and polyols (hydroxy groups), thereby tending to have low solubility in solvents.

In terms of further improving film formability, one or both of a (meth)acrylamide compound and/or polyfunctional acrylic compound are further contained. Polymers of (meth)acrylamide compounds not only improve compatibility between complexes of the π-conjugated conductive polymer and the polyanion, but also further improve electrical conductivity.

The content of the acrylic compound is preferably 0.05 to 50% by weight and more preferably 0.3 to 30% by weight based on a value of 100% by weight of the total amount of the π-conjugated conductive polymer and the polyanion. If the content of the acrylic compound is less than 0.05% by weight, the film formability of the conductive polymer solution becomes inadequate, while if the content exceeds 50% by weight, the content of the π-conjugated conductive polymer in the conductive coating film decreases, thereby preventing the obtaining of adequate electrical conductivity.

Radical polymerization, thermal polymerization, photoradical polymerization or plasma polymerization can be applied for polymerization of the acrylic compound.

In the case of radical polymerization, an azo compound such as azobisisobutyronitrile or a peroxide such as benzoyl peroxide, diacyl peroxides, peroxy esters or hydroperoxides are used as polymerization initiators to carryout polymerization.

In the case of photoradical polymerization, polymerization is carried out by using a carbonyl compound, sulfur compound, organic peroxide or azo compound and the like for the polymerization initiator. Specific examples include benzophenone, Michler's ketone, xanthone, thioxanthone, 2-ethylanthraquinone, acetophenone, trichloroacetophenone, 2-hydroxy-2-methyl-propiophenone, 1-hydroxycyclohexyl phenyl ketone, benzoyl ether, 2,2-diethoxyacetophenone, 2,2-dimethoxy-2-phenylacetophenone, benzyl, methyl benzoylformate, 1-phenyl-1,2-propanedione-2-(o-benzoyl) oxime, 2,4,6-trimethylbenzoyl diphenyl phosphine oxide, tetramethyl thiuram, dithiocarbamate, benzoyl peroxide, N-lauryl pyridium azide and polymethylphenylsilane.

In the case of plasma polymerization, a polymer is formed by radical recombination following fragmentation and rearrangement due to short-term radiation of plasma and transfer of energy from plasma electron bombardment.

In addition, cationic polymerization is employed for polymerization of the vinyl ether groups in the compound (a-1) and the compound (b). An electrophilic reagent that generates cations by light or heat, such as a metal halide, organic metal compound or other Lewis acid, halogen, concentrated hydrochloric acid or carbonium ion salt, may be used during cationic polymerization to accelerate the reaction.

(Polymerization Initiator)

Since the polymerization reaction can be accelerated in the case of using an acrylic compound, a photopolymerization initiator or cationic polymerization initiator and the like is preferably contained in the conductive polymer solution.

Examples of photopolymerization initiators include acetophenones, benzophenones, Michler's benzoylbenzoate, tetramethyl thiurammonosulfide and thioxanthones. Moreover, this can be mixed with a photosensitizer such as n-butylamine, triethylamine or tri-n-butylphosphine.

In addition, examples of cationic polymerization initiators include aryl diazonium salts, diaryl halonium salts, triphenyl sulfonium salts, silanol/aluminum chelates and α-sulfonyloxyketones.

(Aromatic Compound Having Two or More Hydroxy Groups)

In addition, the conductive polymer solution preferably contains an aromatic compound having two or more hydroxy groups since such compounds are able to further increase electrical conductivity of the resulting conductive coating film.

Examples of aromatic compounds having two or more hydroxy groups include 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxyphenylsulfone, hydroxyquinone carboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinone sulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, 1,4-dihydroxy-2-naphtoic acid phenyl ester, 4,5-dihydroxynaphthalene-2,7-disulfonic acid and salts thereof, 1,8-dihydroxy-3,6-naphthalene disulfonic acid and salts thereof, 6,7-dihydroxy-2-naphthalene sulfonic acid and salts thereof, 1,2,3-trihydroxybenzene(pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate and ethyl gallate.

Furthermore, a portion of these aromatic compounds also function as reducing agents. Thus, electrical conductivity can be further enhanced by also using an aromatic compound having metal ions or, in the case of silver halide, two or more hydroxy groups, as a reducing agent.

The content of the aromatic compound having two or more hydroxy groups is preferably within the range of 0.05 to 50 mol, and more preferably within the range of 0.3 to 10 mol, per mol of anionic group unit of the polyanion. If the content of the aromatic compound having two or more hydroxy groups per mole of anionic group unit of the polyanion is less than 0.05 mol, electrical conductivity may not be enhanced. In addition, if the content of the aromatic compound having two or more hydroxy groups to 1 mol of the anionic group unit of the polyanion exceeds 50 mol, the content of the π-conjugated conductive polymer in the conductive coating film decreases, thereby preventing the obtaining of adequate electrical conductivity.

(Additives)

Additives may also be contained in the conductive polymer solution as necessary.

There are no particular limitations on the additives provided they can be mixed with the n-conjugate conductive polymer and the polyanion, and examples of additives of the metal ions and silver halide that can be used include alkaline compounds, surfactants, antifoaming agents, coupling agents, antioxidants and ultraviolet absorbers. Examples of additives of the conductive carbon black that can be used include antifoaming agents, coupling agents, antioxidants and ultraviolet absorbers. Examples of additives of the conductive metal oxide particles that can be used include surfactants, antifoaming agents, coupling agents, antioxidants and ultraviolet absorbers.

Known inorganic alkaline compounds or organic alkaline compounds can be used for the alkaline compound. Examples of inorganic alkaline compounds include sodium hydroxide, potassium hydroxide, calcium hydroxide and ammonia.

Examples of organic alkaline compounds include aliphatic amines, aromatic amines, quaternary amines, nitrogen-containing compounds other than amines, metal alkoxides and dimethylsulfoxide. Among these, one type or two or more types selected from the group consisting of aliphatic amines, aromatic amines and quaternary amines are preferable since they further enhance electrical conductivity.

Examples of surfactants include anionic surfactants such as carboxylic acid salts, sulfonic acid salts, sulfuric acid ester salts or phosphoric acid ester salts; cationic surfactants such as amine salts or quaternary ammonium salts; amphoteric surfactants such as carboxybetaine, aminocarboxylic acid salts or imidazoliumbetaine; and nonionic surfactants such as polyoxyethylene alkyl ethers, polyoxyethylene glycerin fatty acid esters, ethylene glycol fatty acid esters or polyoxyethylene fatty acid amides.

Examples of antifoaming agents include silicone resin, polydimethylsiloxane and silicone resin.

Examples of coupling agents include silane coupling agents having a vinyl group, amino group or epoxy group and the like.

Examples of antioxidants include phenol-based antioxidants, amine-based antioxidants, phosphorous-based antioxidants, sulfur-based antioxidants, sugars and vitamins.

Examples of ultraviolet absorbers include benzotriazole-based ultraviolet absorbers, benzophenone-based ultraviolet absorbers, salicylate-based ultraviolet absorbers, cyanoacrylate-based ultraviolet absorbers, oxanilide-based ultraviolet absorbers, hindered amine-based ultraviolet absorbers and benzoate-based ultraviolet absorbers.

Antioxidants and ultraviolet absorbers are preferably used in combination.

(Production Method of Conductive Polymer Solution)

The production method of the conductive polymer solution consists of, for example, preparing a conductive polymer solution by chemical oxidative polymerization of a precursor monomer of a π-conjugated conductive polymer in an aqueous solution of polyanion, and adding arbitrary components to this aqueous solution in the form of a reducing agent for metal ions, reducing agent for the silver halide as necessary, surfactant or neutralizing agent for the conductive carbon black as necessary, or neutralizing agent for the conductive metal oxide particles as necessary.

Here, the conductive carbon black is preferably added in a state that has been emulsified by a surfactant since this improves dispersibility. In addition, the neutralizing agent is preferably added after having added components of the conductive polymer solution other than the neutralizing agent in terms of being able to neutralize with high accuracy. Namely, the neutralizing agent is preferably added last. However, the neutralizing agent is preferably added simultaneous to the other components in the case of desiring to simplify the addition process.

According to the conductive polymer solution of the present invention containing specific metal ions and reducing agent, metal particles are formed by reducing the metal ions with the reducing agent at the time of conductive coating film formation. Consequently, according to the conductive polymer solution of the present invention, a conductive coating film can be formed that has superior electrical conductivity and exhibits low contact resistance with respect to ITO films.

In addition, since the content of the metal ions in the conductive polymer solution is 50% by weight or less based on a value of 100% for the total amount of the π-conjugated conductive polymer and the polyanion, transparency is not impaired by metal particles formed from the metal ions. Thus, according to the conductive polymer solution of the present invention, a conductive coating film can be formed that has superior transparency.

In addition, in the case of using the conductive polymer solution in the form of an aqueous solution, the metal ions can be easily dissolved, thereby making it possible to enhance dispersibility in the solution and as a result, making it possible to improve dispersibility of metal particles in the conductive coating film.

According to the conductive polymer solution of the present invention containing conductive carbon black, a conductive coating film can be formed that contains carbon black, has high electrical conductivity, and exhibits low contact resistance with respect to an ITO film.

Moreover, since the content of the conductive carbon black is low at a maximum of 10% by weight based on a value of 100% by weight for the total amount of the π-conjugated conductive polymer and the polyanion, the transparency of the resulting conductive coating film is high.

According to the conductive polymer solution of the present invention containing silver halide, silver particles can be formed by reduction treatment. Consequently, a conductive coating film can be formed that has high electrical conductivity and exhibits low contact resistance with respect to an ITO film by carrying out reduction treatment on a coating film coated with this conductive polymer solution.

In addition, since the content of silver that composes the silver halide is low at a maximum of 50% by weight based on a value of 100% by weight for the total amount of the π-conjugated conductive polymer and the polyanion, the transparency of the resulting conductive coating film is high.

Although aqueous solutions containing polyanion are normally acidic, conductive metal oxides dissolve in acidic aqueous solutions. Thus, since conductive metal oxide particles end up dissolving even if only the conductive metal oxide particles are added to an aqueous solution containing the π-conjugated conductive polymer and the polyanion, the conductive metal oxide particles are no longer contained in a coating film formed by coating with the resulting solution.

However, according to the conductive polymer solution of the present invention containing conductive metal oxide particles, since the conductive polymer solution of the present invention is neutralized by containing a neutralizing agent, the conductive metal oxide particles remain stable without being dissolved. Consequently, a conductive coating film can be obtained that has superior electrical conductivity and exhibits low contact resistance with respect to an ITO film.

Moreover, since the content of the conductive metal oxide particles in the conductive polymer solution is low at 50% by weight or less based on a value of 100% by weight for the total amount of the π-conjugated conductive polymer and the polyanion, transparency is not impaired by the conductive metal oxide particles. Thus, according to the conductive polymer solution of the present invention, a conductive coating film can be formed that has superior transparency.

<Conductive Coating Film>

The conductive coating film of the present invention has formed by coating the aforementioned conductive polymer solution onto a transparent base. Furthermore, with respect to silver halide, the conductive coating film is formed by coating the aforementioned conductive polymer solution onto a transparent base followed by subjecting to reduction treatment. This conductive coating film at least contains an π-conjugated conductive polymer, polyanion, metal particles formed from metal ions, and at least one type of essential component consisting of a residue of a reducing agent (reducing agent oxide), silver particles formed by reducing a silver halide, conductive carbon black, and a neutralizing agent of conductive metal oxide particles.

Examples of coating methods that are applied for the coating method of the conductive polymer solution include comma coating, reverse coating, lip coating and microgravure coating.

Examples of transparent bases coated with the conductive polymer solution that can be used include films or sheets made of polyethylene terephthalate (PET), polyethylene naphthalate, polyethersulfone, polyetherimide, polyether ether ketone, polyphenylene sulfide, polyarylate, polyimide, polycarbonate, cellulose triacetate or cellulose acetate propionate. In addition, glass plates or silicon plates and the like can also be used.

Hardening treatment is preferably carried out after coating with the conductive polymer solution.

Radiation of heat or light is applied for the hardening method. Ordinary methods can be employed for the heating method, such as hot air heating or infrared heating.

During reduction treatment of the silver halide, the coating film is hardened simultaneous to the formation of silver particles by carrying out heat treatment and/or light irradiation treatment to reduce the silver halide. In the case the conductive polymer solution contains a reducing agent, the silver halide can be rapidly reduced by heat treatment or light irradiation treatment.

The heating temperature is preferably 80 to 150° C. If the heating temperature is 80° C. or higher, the silver halide can be reduced in a short period of time, while if the heating temperature is 150° C. or lower, thermal deterioration of the coating film can be prevented. In addition, the heating time is preferably 5 minutes or less in consideration of productivity.

In addition in the case of hardening by light irradiation, a method can be employed in which ultraviolet light is radiated from a light source such as a super-high pressure mercury lamp, high-pressure mercury lamp, low-pressure mercury lamp, carbon arc lamp, xenon arc lamp or metal halide lamp. Illuminance during radiation of ultraviolet light is preferably 100 mW/cm$^2$. Since the reducing agent inhibits polymerization of the acrylic compound, if the illuminance is less than 100 mW/cm$^2$, crosslinking becomes inadequate and sliding resistance (durability) of the conductive coating film tends to be low. In the case of hardening by irradiating the silver halide with light, the cumulative amount of light is preferably 100 to 1000 mJ/cm$^2$. If the cumulative amount of light is 100 mJ/cm$^2$ or more, the silver halide can be adequately reduced. However, since there is no change in the degree of reduction of the silver halide even if the cumulative amount of light exceeds 1000 mJ/cm$^2$ thereby making this unbeneficial, the cumulative amount of light is preferably 1000 mJ/cm$^2$ or less.

Furthermore, illuminance in the present invention refers to the value measured using the Topcon Model UVR-T1 (industrial-use UV checker, light receiver: UD-T36, measuring wavelength range: 300 to 390 nm, peak sensitivity: approx. 355 nm). During this hardening, the reducing agent reduces the metal ions to form metal particles while the reducing agent itself is oxidized. Furthermore, heating and light irradiation during hardening are thought to accelerate reduction of the metal ions by the reducing agent.

The conductive coating film of the present invention is formed from the aforementioned conductive polymer solution, and since, in addition to the π-conjugated conductive polymer and the polyanion, it also contains at least one component consisting of metal particles formed by reduction of specific metal ions, silver particles formed by reduction of silver halide, conductive carbon black and conductive metal oxide particles, has high electrical conductivity and low contact resistance with respect to an ITO film.

In addition, since metal particles formed from metal ions in the conductive polymer solution, silver particles formed from silver halide, conductive carbon black and conductive metal oxide particles are dispersed in the conductive coating film of the present invention at high dispersibility, and the contents of the metal particles, silver particles, conductive carbon black and conductive metal oxide particles are low at a maximum of 50% by weight based on a value of 100% by weight for the total amount of the π-conjugated conductive polymer and the polyanion, the transparency of the conductive coating film is high.

Although the conductive coating film of the present invention is preferably used in, for example, an input device described below, it may also be used as a transparent electrode of a display device. Examples of display devices include an electroluminescence display and a liquid crystal display.

<Input Device>

The input device of the present invention is provided with a transparent electrode in the form of the aforementioned conductive coating film. The input device is preferably a resistive film type touch panel since this allows the effects of the present invention to be particularly demonstrated. The following provides an explanation of an example of a resistive film type touch panel provided with a transparent electrode in the form of the aforementioned conductive coating film.

As shown in FIG. 1, in the resistive film type touch panel of the present invention, a movable electrode sheet 10 arranged on the side of an input operator, in which the aforementioned conductive coating film 12 is formed on the surface of a transparent base 11, and a fixed electrode sheet 20 arranged on the side of an image display device, in which an ITO film 22 is formed on the surface of a transparent base 21, are provided such that the conductive coating film 12 and the ITO film 22 are in mutual opposition. In addition, a gap is formed between the movable electrode sheet 10 and the stationary electrode sheet 20 by arranging transparent dot spacers 24 there between.

Examples of the transparent bases 11 and 21 of the movable electrode sheet 10 and the stationary electrode sheet 20 include a plastic film or glass film having a single layer or two or more layers, and a laminate of a plastic film and glass plate. However, a plastic film is used preferable for the transparent base 11 of the movable electrode sheet 10 since it has flexibility, while a glass plate is used preferably for the transparent base 21 of the stationary electrode sheet 20 since it is easily immobilized.

The thickness of the transparent base 11 of the movable electrode sheet 10 is preferably 100 to 250 μm. If the thickness of the transparent base 11 is 100 μm or more, adequate strength can be secured, while is the thickness if 250 μm or less, adequate flexibility can be secured.

The thickness of the conductive coating film 12 of the movable electrode sheet 10 is preferably 50 to 700 μm. If the thickness of the transparent base 11 is 50 μm or more, adequate electrical conductivity can be secured, while if the thickness is 700 μm or less, adequate flexibility and transparency can be secured. If the thickness of the conductive coating film 12 is 50 μm or more, adequate electrical conductivity can be secured, while if the thickness is 700 μm or less, adequate flexibility and transparency can be secured.

The thickness of the transparent base 21 of the stationary electrode sheet 20 is preferably 0.8 to 2.5 mm. If the thickness of the transparent base 21 is 0.8 mm or more, adequate strength can be secured, while if the thickness is 2.5 mm or less, the transparent base 21 can be made to be thin thereby realizing conservation of space.

The thickness of the ITO film 22 of the stationary electrode sheet 20 is preferably 0.01 to 1.0 μm. If the thickness of the ITO film is 0.01 μm or more, adequate electrical conductivity can be secured, while if the thickness if 1.0 μm or less, the ITO film can be made to be thin thereby realizing conservation of space.

The gap between the movable electrode sheet 10 and the stationary electrode sheet 20 when not pressed together is preferably 20 to 100 μm. If the gap between the movable electrode sheet 10 and the stationary electrode sheet 20 when not pressed together is 20 μm or more, the movable electrode sheet 10 and the stationary electrode sheet 20 can be reliably prevented from making contact when not pressed together, while if the gap is 100 μm or less, the movable electrode sheet 10 and the stationary electrode 20 can reliably contacted when pressed together. The size of the dot spacers 24 is suitably selected in order to achieve the gap as described above.

In this resistive film type touch panel, when the movable electrode sheet 10 is pressed by a finger or stylus, the conductive coating film 12 of the movable electrode sheet 10 and the ITO film 22 of the stationary electrode sheet 12 make contact resulting in electrical continuity, and a location is detected by incorporating the voltage at that time.

In this type of resistive film type touch panel, since the aforementioned conductive coating film 12 is used as a transparent electrode, contact resistance with respect to the ITO film 22 is low, thereby reducing the likelihood of occurrences of malfunctions such as decreased input sensitivity or delays in coordinate input time. In addition, visibility of images of the image display device is superior due to the high transparency of the conductive coating film 12.

In addition, the input device may also be an electrostatic capacitive type touch panel. In an electrostatic capacitive type touch panel that uses the aforementioned conductive coating film, for example, a pair of transparent electrodes composed of the aforementioned conductive coating film are provided on both sides of a transparent base, a low-voltage electric field is formed throughout the entire transparent electrodes, and as a result of pressing with a finger, a location is detected by detecting a change in surface charge.

In this electrostatic capacitive type touch panel, since at least one component consisting of metal particles, silver halide, conductive carbon black and conductive metal oxide particles are contained, and the aforementioned highly transparent, conductive coating film is used as a transparent electrode, changes in charge can be reliably detected, thereby reducing the likelihood of malfunctions. In addition, the visibility of images of the image display device is superior due to the high transparency of the conductive coating film.

This type of input device is installed in, for example, electronic organizers, personal digital assistants (PDA), cell phones, PHS, automated teller machines (ATM), vending machines or point-of-sale (POS) cash registers.

EXAMPLES

Although the following indicates specific examples of the present invention, the present invention is not limited to these examples.

Production Example 1

Preparation of Polystyrene Sulfonic Acid 206 g of sodium styrene sulfonate were dissolved in 1000 ml of ion exchange water followed by dropping in over the course of 20 minutes 1.14 g of an ammonium persulfate oxidizing agent solution preliminarily dissolved in 10 ml of water while stirring at 80° C. and continuing to stir for 2 hours.

1000 ml of sulfuric acid diluted to 10% by weight and 10000 ml of ion exchange water were added to the resulting solution containing sodium styrene sulfonate, about 10000 ml of solution containing sodium polystyrene sulfonate were removed by ultrafiltration, 10000 ml of ion exchange water were added to the residual liquid, and about 10000 ml of solution were removed by ultrafiltration. The above ultrafiltration procedure was repeated three times.

Moreover, about 10000 ml of ion exchange water were added to the resulting liquid, and about 10000 ml of solution were removed by ultrafiltration. This ultrafiltration procedure was repeated three times.

The ultrafiltration conditions were as indicated below (to apply similarly in other examples as well).

Cut-off molecular weight of ultrafiltration membrane: 30000
Cross-flow type
Supplied liquid flow rate: 3000 ml/min
Membrane pressure: 0.12 Pa Water present in the resulting solution was removed under reduced pressure to obtain polystyrene sulfonic acid in the form of a colorless solid.

Production Example 2

Preparation of Aqueous Solution of Polystyrene Sulfonic Acid-Doped Poly(3,4-ethylenedioxythiophene)

14.2 g of 3,4-ethylenedioxythiophene were mixed at 20° C. with a solution in which 36.7 g of the polystyrene sulfonic acid obtained in Production Example 1 were dissolved in 2000 ml of ion exchange water.

29.64 g of ammonium persulfate dissolved in 200 ml of ion exchange water and 8.0 g of an oxidation catalyst solution of ferric sulfate were slowly added while holding the resulting mixed solution at 20° C. and stirring followed by allowing to react for 3 hours while stirring.

2000 ml of ion exchange water were added to the resulting reaction liquid followed by removing about 2000 ml of the solution using ultrafiltration. This procedure was repeated three times.

200 ml of sulfuric acid diluted to 10% by weight and 2000 ml of ion exchange water were added to a liquid on which the aforementioned filtration treatment had been carried out, about 2000 ml of the treated liquid were removed by ultrafiltration, 2000 ml of ion exchange water were added thereto, and about 2000 ml of liquid were removed by ultrafiltration. This procedure was repeated three times.

Moreover, 2000 ml of ion exchange water were then added to the resulting treated liquid followed by removing about 2000 ml of treated liquid by ultrafiltration. This procedure was repeated five times to obtain a blue aqueous solution containing about 1.5% by weight of polystyrene sulfonic acid-doped poly(3,4-ethylenedioxythiophene) (PEDOT-PSS).

Metal Ion Example 1

0.5 g of silver p-toluenesulfonate (in which silver ions were present at 2% by weight based on a value of 100% by weight for the total amount of π-conjugated conductive polymer and polyanion) were added to 600 g of the PEDOT-PSS aqueous solution obtained in Production Example 2 followed by stirring to prepare a PEDOT-PSS aqueous solution containing silver ions.

Separate from the above, 3.6 g of hydroxyquinone, 0.9 g of Irgacure 127 (Ciba Specialty Chemicals Inc.), 18 g of 2-hydroxyethylacrylamide, 7.2 g of pentaerythritol triacrylate and 300 g of ethanol were mixed and stirred. The PEDOT-PSS aqueous solution containing silver ions was then added to the resulting solution followed by stirring to obtain a conductive polymer solution A1.

Silver Halide Example 1

0.5 g of silver chloride (in which the amount of silver that composed the silver chloride was 5.3% by weight based on a value of 100% by weight for the total amount of π-conjugated conductive polymer and polyanion), 3.6 g of hydroquinone, 0.9 g of Irgacure 127 (Ciba Specialty Chemicals Inc.), 18 g of 2-hydroxyethylacrylamide, 7.2 g of pentaerythritol triacrylate and 300 g of ethanol were mixed and stirred. 600 g of the PEDOT-PSS aqueous solution obtained in Production Example 2 were then added to the resulting mixed solution followed by dispersing with a Nanomizer (Yoshida Kikai Co., Ltd.) to obtain a conductive polymer solution A2.

Conductive Carbon Black Example 1

1 g (1.7% by weight based on a value of 100% by weight for the total amount of the π-conjugated conductive polymer and polyanion) of a paste of furnace black in the form of Ketjen black (Lion Paste W-376R, Lion Corp., containing nonionic surfactant, solid concentration: 12.5% by weight) was added to 600 g of the PEDOT-PSS aqueous solution obtained in Production Example 2 followed by stirring to obtain a PEDOT-PSS aqueous solution containing Ketjen black.

Separate from the above, 3.6 g of 2,3,3',4,4',5'-hexahydroxybenzophenone, 0.9 g of Irgacure 127 (Ciba Specialty Chemicals Inc.), 18 g of 2-hydroxyethylacrylamide, 7.2 g of pentaerythritol triacrylate and 300 g of ethanol were mixed and stirred. The PEDOT-PSS aqueous solution containing Ketjen black was then added to the resulting solution followed by dispersing with a Nanomizer (Yoshida Kikai Co., Ltd.) to obtain a conductive polymer solution A3.

Conductive Metal Oxide Particle Example 1

20.1 g of imidazole (2 mol equivalents based on the polyanion) were added to 600 g of the PEDOT-PSS aqueous solution obtained in Production Example 2 followed by stirring to prepare a PEDOT-PSS aqueous solution containing imidazole.

Separate from the above, 3.6 g of 2,3,3',4,4',5'-hexahydroxybenzophenone, 0.9 g of Irgacure 127 (Ciba Specialty Chemicals Inc.), 18 g of 2-hydroxyethylacrylamide, 7.2 g of pentaerythritol triacrylate and 300 g of ethanol and 0.3 g (4.1% by weight based on a value of 100% by weight for the total amount of π-conjugated conductive polymer and polyanion) of tin-doped indium oxide (Sumitomo Metal Mining Co., Ltd., X500 Series, mean particle diameter: 100 to 140 nm) were mixed and stirred. The PEDOT-PSS aqueous solution containing imidazole was then added to the resulting solution followed by stirring to obtain a conductive polymer solution A4. The pH at 25° C. of this conductive polymer solution A4 was measured. The measurement results are shown in Table 4.

Each of the conductive polymer solutions A1 to A4 obtained in Example 1 were coated onto a polyethylene terephthalate film (Toyobo Co., Ltd., A4300, thickness: 188 μm) with a reverse coater, and after drying by irradiating with infrared light for 2 minutes at 100° C., was hardened by irradiating with ultraviolet light (high-pressure mercury lamp, 120 W, 360 mJ/cm$^2$, 178 mW/cm$^2$) to respectively form conductive coating films. The surface resistance, light transmittance and contact resistance of the conductive coating films were measured according to the following methods. Those results are shown in Tables 1, 2, 3 and 4.

[Surface Resistance Value]

Surface resistance values were measured in compliance with JIS K 7194 using the Loresta MCP-T600 manufactured by Mitsubishi Chemical Corp.

[Light Transmittance]

Light transmittance was measured in compliance with JIS K 7136 using a haze meter measuring instrument (NDH$_{5000}$) manufactured by Nippon Denshoku Industries Co., Ltd.

[Contact Resistance]

Figure 2:
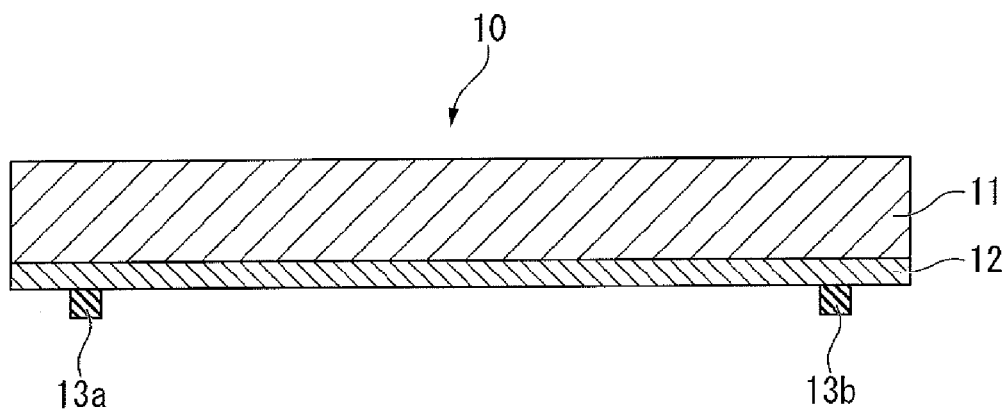
FIG. 2 is a cross-sectional view showing an electrode sheet on the side of an input operator in a method of measuring contact resistance.

The conductive polymer solutions were coated onto a transparent base 11 (polyethylene terephthalate film, A4300 manufactured by Toyobo Co., Ltd., thickness: 188 μm) to form a conductive coating film 12 which was then cut to a size of 40 mm×50 mm. A conductive paste (FA-401CA manufactured by Fujikura Kasei Co., Ltd.) was screen-printed onto the edges of the cut sheet of the conductive coating film 12 in the direction of width followed by drying to form electrode wires 13a and 13b and obtain a movable electrode sheet 10 for use on the side of an input operator (see FIG. 2).

Figure 3:
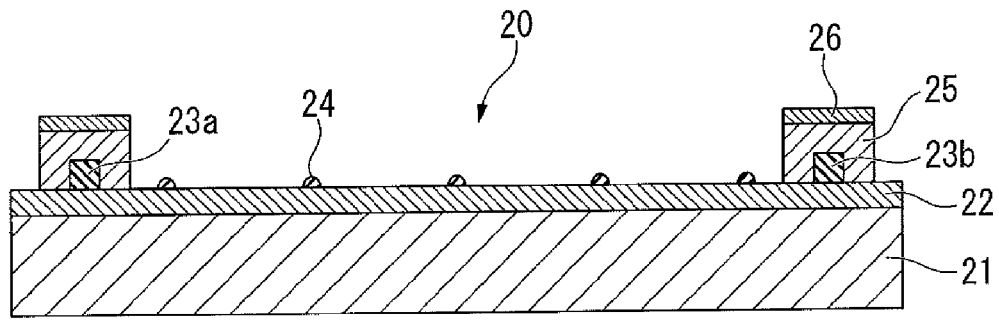
FIG. 3 is a cross-sectional view showing an electrode sheet on the side of an image display device in a method of measuring contact resistance.

In addition, a glass plate 21 (surface resistance: 300Ω) was prepared that was provided with an ITO film 22 and which was cut to a size of 40 mm×50 mm. A conductive paste (XA436 manufactured by Fujikura Kasei Co., Ltd.) was screen-printed onto the edges of the prepared glass plate 21 in the lengthwise direction of the ITO film 22 followed by drying to form electrode wires 23a and 23b. Next, a paste for dot spacers (SN-8400C manufactured by Fujikura Kasei Co., Ltd.) was screen-printed onto the ITO film 22 followed by drying and irradiating with ultraviolet light to form dot spacers 24. Next, a resist paste (SN-8800G manufactured by Fujikura Kasei Co., Ltd.) was screen-printed onto the electrode wires 23a and 23b followed by drying and irradiating with UV light to form insulating layers 25. Moreover, an adhesive (XB-114 manufactured by Fujikura Kasei Co., Ltd.) was screen-printed onto the insulating layers 25 followed by drying to obtain adhesive layers 26 for affixing to a movable electrode sheet 10. As a result, a stationary electrode sheet 20 was obtained for an image display device (see FIG. 3).

Figure 4:
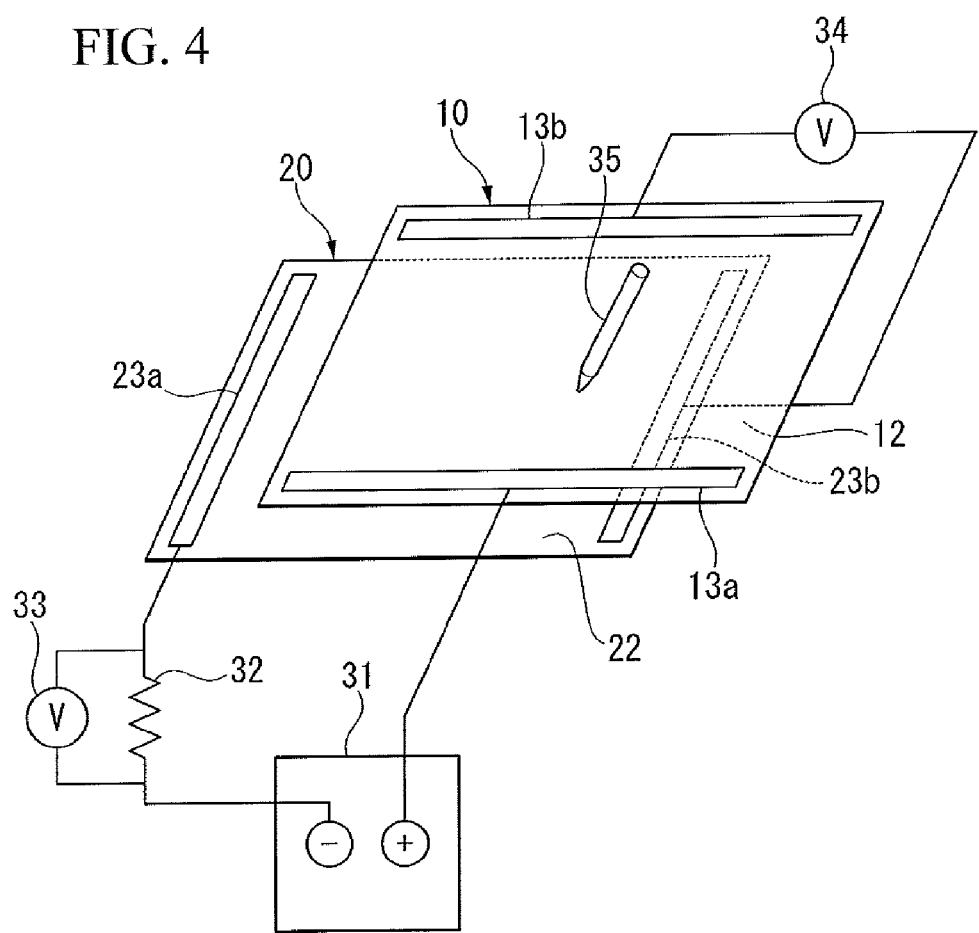
FIG. 4 is a schematic diagram showing a circuit in a method of measuring contact resistance.

Next, as shown in FIG. 4, the movable electrode sheet 10 and the stationary electrode sheet 20 were arranged so that the conductive coating film 12 and the ITO film were mutually opposed followed by laminating with the adhesive layers 26 to fabricate a resistive film type touch panel module. In addition, one of the electrode wires 23a of the stationary electrode sheet 20 and a precision power supply 31 were electrically connected through a pull-up resistor (82.3 kΩ) and a voltage measurement tester 33 of the pull-up resistor 32 connected in parallel with the pull-up resistor 32. In addition, the precision power supply 31 and one of the electrode wires 13a of the movable electrode sheet 10 were electrically connected. In addition, the other electrode wire 13b of the movable electrode sheet 10 and the other electrode wire 23b of the stationary electrode sheet 20 were electrically connected through a voltage measurement tester 34 of the resistive film type touch panel module. As a result, an electrical circuit was obtained for measuring contact resistance.

Contact resistance was measured in the following manner. The voltage of the pull-up resistor and the voltage of the resistive film type touch panel module were measured when the movable electrode sheet 10 was pressed with a load of 250 g with a polyacetal stylus having an 0.8 R tip and a voltage of 5 V was applied by the precision power supply 31, and contact resistance was then measured on the basis of these measurement results.

More specifically, the value of current running to the pull-up resistor 32 was calculated from Ohm's law using the measured voltage value, and that calculated current value and the voltage value of the resistive film type touch panel module were substituted into the following equation to determine the contact resistance.

Contact resistance (Ω)=[(voltage (V) of resistive film type touch panel module)/(voltage (V) of pull-up resistor)]×pull-up resistance (Ω)

[Rubbing Test]

In order to measure the coating film strength of the conductive coating films, the conductive coating films were rubbed 30 times back and forth with a Kimwipe (Nippon Paper Crecia Co., Ltd.) moistened with ethanol while applying a load of 100 gf/cm$^2$ followed by visually inspecting the conductive coating films for missing portions thereof. In addition, contact resistance was measured following this rubbing test. These results were used as an indicator of the film strength of the conductive coating films.

⊚: No peeling
◯: Slight peeling
Δ: Some peeling
X: Complete peeling

TABLE 1

|  | Conductive polymer solution | Amt. metal ions added (wt %) | Amt. reducing agent added (wt %) | Surface resistance (Ω) | Light transmittance (%) | Haze value (%) | Contact resistance (Ω) | Film peeling after rubbing test | Contact resistance after rubbing test (Ω) |
|---|---|---|---|---|---|---|---|---|---|
| Ex. 1 | A1 | 2.0 | 19.7 | 560 | 85.3 | 1.34 | 780 | ⊚ | 790 |
| Ex. 2 | B1 | 0.08 | 571.4 | 470 | 84.5 | 1.11 | 630 | ⊚ | 650 |
| Ex. 3 | C1 | 8.3 | 5.4 | 610 | 85.8 | 1.65 | 1200 | ⊚ | 1210 |
| Ex. 4 | D1 | 4.4 | 11.6 | 530 | 85.9 | 1.21 | 810 | ⊚ | 800 |
| Ex. 5 | E1 | 28.9 | 6.9 | 580 | 80.8 | 2.22 | 470 | ⊚ | 490 |
| Ex. 6 | F1 | 49.5 | 3.5 | 510 | 76.1 | 3.47 | 280 | ⊚ | 250 |
| Ex. 7 | G1 | 2.0 | 19.7 | 660 | 85.3 | 1.32 | 780 | X | Over |
| Ex. 8 | H1 | 8.3 | 5.4 | 560 | 84.5 | 1.10 | 630 | Δ | Over |
| Ex. 9 | I1 | 28.9 | 6.9 | 510 | 83.8 | 1.64 | 590 | ○ | Over |
| Ex. 10 | J1 | 8.8 | 11.1 | 580 | 85.4 | 1.28 | 600 | ⊚ | 610 |
| Ex. 11 | K1 | 6.88 | 11.0 | 540 | 85.8 | 1.24 | 610 | ⊚ | 620 |
| Ex. 12 | L1 | 14.5 | 16.5 | 560 | 85.6 | 1.26 | 580 | ⊚ | 580 |
| Ex. 13 | — | 2.0 | 19.7 | 590 | 85.2 | 1.35 | 760 | X | Over |
| Ex. 14 | M1 | 20.0 | 7.5 | 570 | 84.7 | 1.48 | 480 | ⊚ | 480 |
| Ex. 15 | N1 | 0.96 | 156.5 | 550 | 85.3 | 1.22 | 850 | ⊚ | 860 |
| Ex. 16 | O1 | 3.5 | 14.1 | 550 | 85.4 | 1.16 | 760 | ⊚ | 770 |
| Ex. 17 | P1 | 7.0 | 7.1 | 540 | 85.1 | 1.18 | 710 | ⊚ | 710 |
| Ex. 18 | Q1 | 0.8 | 22.5 | 570 | 85.9 | 1.14 | 890 | ⊚ | 900 |
| Comp. Ex. 1 | R1 | 0 | 19.7 | 550 | 85.2 | 1.34 | 11600 | ⊚ | 11560 |
| Comp. Ex. 2 | S1 | 0.08 | 0 | 480 | 84.4 | 1.10 | 13100 | ⊚ | 12800 |
| Comp. Ex. 3 | T1 | 0.00083 | 53731 | 510 | 85.6 | 1.09 | 8630 | ⊚ | 9100 |
| Comp. Ex. 4 | U1 | 52.5 | 0.95 | 420 | 68.1 | 5.68 | 190 | ⊚ | 180 |
| Comp. Ex. 5 | V1 | 2.8 | 19.7 | 570 | 85.2 | 1.25 | 11360 | ⊚ | 11400 |
| Comp. Ex. 6 | W1 | 5.5 | 27.5 | 560 | 85.3 | 1.24 | 11550 | ⊚ | 11590 |

Amounts of metal ions added shown in the table indicate the amount based on a value of 100% by weight for the total amount of π-conjugated conductive polymer and polyanion.

The amounts of reducing agent added shown in the table indicate the amount based on a value of 100% by weight for the amount of metal ions.

TABLE 2

|  | Conductive polymer solution | Amt. of silver composing silver halide (wt %) | Amt. reducing agent added (wt %) | Surface resistance (Ω) | Light transmittance (%) | Haze value (%) | Contact resistance (Ω) | Film peeling after rubbing test | Contact resistance after rubbing test (Ω) |
|---|---|---|---|---|---|---|---|---|---|
| Ex. 1 | A2 | 5.3 | 9.6 | 560 | 85.3 | 1.36 | 460 | ⊚ | 470 |
| Ex. 2 | B2 | 20.1 | 2.4 | 470 | 84.5 | 1.89 | 320 | ⊚ | 330 |
| Ex. 3 | C2 | 47.6 | 1.1 | 450 | 80.1 | 2.22 | 250 | ⊚ | 240 |
| Ex. 4 | D2 | 0.24 | 211.8 | 520 | 85.7 | 1.24 | 730 | ⊚ | 740 |
| Ex. 5 | E2 | 0.005 | 6363.6 | 540 | 85.2 | 1.12 | 1100 | ⊚ | 1080 |
| Ex. 6 | F2 | 5.3 | 0.096 | 550 | 85.4 | 1.35 | 790 | ⊚ | 810 |
| Ex. 7 | G2 | 20.1 | — | 480 | 84.4 | 1.87 | 970 | ⊚ | 980 |
| Ex. 8 | H2 | 5.3 | 9.6 | 650 | 85.4 | 1.11 | 550 | X | Over |
| Ex. 9 | I2 | 47.6 | 1.1 | 430 | 80.2 | 2.21 | 280 | Δ | Over |
| Ex. 10 | J2 | 20.1 | 2.4 | 430 | 84.4 | 1.87 | 310 | ○ | Over |
| Ex. 11 | — | 5.3 | 9.6 | 560 | 85.2 | 1.35 | 480 | X | Over |
| Comp. Ex. 1 | K2 | 52.7 | 0.96 | 430 | 78.2 | 8.34 | 220 | ⊚ | 210 |
| Comp. Ex. 2 | L2 | 0.0007 | 63157 | 580 | 85.1 | 1.10 | 9870 | ⊚ | 10120 |
| Comp. Ex. 3 | M2 | — | — | 550 | 85.2 | 1.09 | 12600 | ⊚ | 11540 |

Amounts of silver that compose the silver halide shown in the table indicate the amount based on a value of 100% by weight for the total amount of π-conjugated conductive polymer and polyanion.

The amounts of reducing agent added shown in the table indicate the amount based on a value of 100% by weight for the amount silver that composes the silver halide.

π-conjugated conductive polymer and polyanion) were added to 600 g of the PEDOT-PSS aqueous solution obtained in Production Example 2 followed by stirring to prepare a PEDOT-PSS aqueous solution containing silver ions.

Separate from the above, 3.6 g of 2,3,3',4,4',5'-hexahydroxybenzophenone, 0.9 g of Irgacure 127 (Ciba Specialty Chemicals Inc.), 18 g of 2-hydroxyethylacrylamide, 7.2 g of

TABLE 3

|  | Conductive polymer solution | pH | Amt. conductive carbon black added (wt %) | Surface resistance (Ω) | Light transmittance (%) | Haze value (%) | Contact resistance (Ω) | Film peeling after rubbing test | Contact resistance after rubbing test (Ω) |
|---|---|---|---|---|---|---|---|---|---|
| Ex. 1 | A3 | 2.6 | 1.7 | 560 | 84.3 | 1.80 | 780 | ⊚ | 790 |
| Ex. 2 | B3 | 8.1 | 9.2 | 870 | 78.5 | 3.92 | 530 | ⊚ | 550 |
| Ex. 3 | C3 | 7.5 | 0.64 | 810 | 85.8 | 1.25 | 990 | ⊚ | 1020 |
| Ex. 4 | D3 | 9.1 | 0.023 | 930 | 85.9 | 1.11 | 1410 | ⊚ | 1480 |
| Ex. 5 | E3 | 2.6 | 0.42 | 980 | 84.8 | 1.26 | 1170 | ⊚ | 1190 |
| Ex. 6 | F3 | 8.1 | 1.7 | 960 | 84.6 | 1.23 | 520 | Δ | Over |
| Ex. 7 | G3 | 8.4 | 9.2 | 920 | 78.8 | 4.12 | 570 | X | Over |
| Ex. 8 | — | 2.3 | 1.7 | 560 | 84.2 | 1.85 | 880 | X | Over |
| Comp. Ex. 1 | H3 | 7.4 | 0.0064 | 910 | 85.6 | 1.08 | 9630 | ⊚ | 9900 |
| Comp. Ex. 2 | I3 | 9.4 | 11.1 | 920 | 66.1 | 13.1 | 390 | ⊚ | 380 |

The pH values shown in the table indicate the pH of the conductive polymer solution.

Amounts of conductive carbon black added shown in the table indicate the amount based on a value of 100% by weight for the total amount of π-conjugated conductive polymer and polyanion.

ditrimethylolpropane tetraacrylate and 300 g of ethanol were mixed and stirred. The PEDOT-PSS aqueous solution containing silver ions was then added to the resulting solution followed by stirring to obtain a conductive polymer solution B1.

TABLE 4

|  | Conductive polymer solution | pH | Amt. conductive metal oxide particles added (wt %) | Surface resistance (Ω) | Light transmittance (%) | Haze value (%) | Contact resistance (Ω) | Film peeling after rubbing test | Contact resistance after rubbing test (Ω) |
|---|---|---|---|---|---|---|---|---|---|
| Ex. 1 | A4 | 7.9 | 4.1 | 960 | 85.3 | 1.30 | 780 | ⊚ | 790 |
| Ex. 2 | B4 | 8.3 | 27.8 | 870 | 80.5 | 3.92 | 430 | ⊚ | 450 |
| Ex. 3 | C4 | 7.2 | 48.6 | 810 | 78.8 | 7.45 | 290 | ⊚ | 300 |
| Ex. 4 | D4 | 9.1 | 0.014 | 930 | 85.9 | 1.11 | 1510 | ⊚ | 1580 |
| Ex. 5 | E4 | 7.9 | 0.42 | 980 | 84.8 | 1.26 | 1170 | ⊚ | 1190 |
| Ex. 6 | F4 | 7.9 | 0.42 | 960 | 84.6 | 1.23 | 620 | X | Over |
| Ex. 7 | G4 | 7.9 | 4.1 | 1010 | 85.1 | 1.30 | 1350 | X | Over |
| Ex. 8 | H4 | 8.3 | 27.8 | 860 | 80.5 | 3.98 | 410 | Δ | Over |
| Ex. 9 | I4 | 7.2 | 48.6 | 800 | 79.1 | 7.33 | 280 | ○ | Over |
| Ex. 10 | — | 7.9 | 4.1 | 1030 | 85.2 | 1.25 | 830 | X | Over |
| Comp. Ex. 1 | J4 | 2.5 | 4.1 | 950 | 85.2 | 1.31 | 11600 | ⊚ | 11560 |
| Comp. Ex. 2 | K4 | 7.2 | 0.0069 | 910 | 85.6 | 1.18 | 9630 | ⊚ | 9900 |
| Comp. Ex. 3 | L4 | 9.1 | 55.6 | 820 | 68.1 | 10.1 | 190 | ⊚ | 180 |

The pH values shown in the table indicate the pH of the conductive polymer solution.

Amounts of conductive carbon black added shown in the table indicate the amount based on a value of 100% by weight for the total amount of π-conjugated conductive polymer and polyanion.

Metal Ion Example 2

0.01 g of silver nitrate (0.08% by weight of silver ions based on a value of 100% by weight for the total amount of A conductive coating film was then formed and evaluated in the same manner as Metal Ion Example 1 with the exception of using the conductive polymer solution B1 instead of the conductive polymer solution A1. The evaluation results are shown in Table 1.

Silver Halide Example 2

2 g of silver chloride (in which the amount of silver that composed the silver chloride was 20.1% by weight based on a value of 100% by weight for the total amount of π-conjugated conductive polymer and polyanion), 0.9 g of Irgacure 127 (Ciba Specialty Chemicals Inc.), 3.6 g of 2,3,3',4,4',5'-hexahydroxybenzophenone, 18 g of 2-hydroxyethylacrylamide, 7.2 g of tripropylene glycol diacrylate and 300 g of ethanol were mixed and stirred. 600 g of the PEDOT-PSS aqueous solution obtained in Production Example 2 were then added to the resulting mixed solution followed by dispersing with a Nanomizer to obtain a conductive polymer solution B2. A conductive coating film was then formed and evaluated in the same manner as Silver Halide Example 1 with the exception of using the conductive polymer solution B2 instead of the conductive polymer solution A2. The evaluation results are shown in Table 2.

Conductive Carbon Black Example 2

20.1 g of imidazole (2 mol equivalents based on the polyanion) and 4 g (9.2% by weight based on a value of 100% by weight for the total amount of the π-conjugated conductive polymer and polyanion) of a paste of Ketjen black (Lion Paste W-311N, Lion Corp., containing nonionic surfactant, solid concentration: 16.5% by weight) were added to 600 g of the PEDOT-PSS aqueous solution obtained in Production Example 2 followed by stirring to prepare a PEDOT-PSS aqueous solution containing imidazole and Ketjen black.

Separate from the above, 3.6 g of methyl gallate, 0.9 g of Irgacure 127 (Ciba Specialty Chemicals Inc.), 18 g of 2-hydroxyethylacrylamide, 7.2 g of ditrimethylolpropane tetraacrylate and 300 g of ethanol were mixed and stirred. The PEDOT-PSS aqueous solution containing imidazole and Ketjen black was then added to the resulting solution followed by dispersing with a Nanomizer to obtain a conductive polymer solution B3. A conductive coating film was then formed and evaluated in the same manner as Conductive Carbon Black Example 1 with the exception of using the conductive polymer solution B3 instead of the conductive polymer solution A3. The evaluation results are shown in Table 3.

Conductive Metal Oxide Particle Example 2

5.4 g of triethylamine (1.1 mol equivalents based on the polyanion) were added to 600 g of the PEDOT-PSS aqueous solution obtained in Production Example 2 followed by stirring to prepare a PEDOT-PSS aqueous solution containing triethylamine.

Separate from the above, 3.6 g of methyl gallate, 0.9 g of Irgacure 127 (Ciba Specialty Chemicals Inc.), 18 g of 2-hydroxyethylacrylamide, 7.2 g of ditrimethylolpropane tetraacrylate, 300 g of ethanol and 3 g (27.8% by weight based on a value of 100% by weight for the total amount of π-conjugated conductive polymer and polyanion) of gallium-doped zinc oxide (Hakusuitech Ltd., Pazet, mean particle diameter: 20 to 40 nm) were mixed and stirred. The PEDOT-PSS aqueous solution containing triethylamine was then added to the resulting solution followed by stirring to obtain a conductive polymer solution B4. A conductive coating film was then formed and evaluated in the same manner as Conductive Metal Oxide Particle Example 1 with the exception of using the conductive polymer solution B4 instead of the conductive polymer solution A4. The evaluation results are shown in Table 4.

Metal Ion Example 3

1 g of chloroplatinic acid (8.3% by weight of platinum ions based on a value of 100% by weight for the total amount of π-conjugated conductive polymer and polyanion) were added to 600 g of the PEDOT-PSS aqueous solution obtained in Production Example 2 followed by stirring to prepare a PEDOT-PSS aqueous solution containing platinum ions.

Separate from the above, 3.6 g of ascorbic acid, 1.8 g of methyl gallate, 0.9 g of Irgacure 127 (Ciba Specialty Chemicals Inc.), 18 g of 2-hydroxyethylacrylamide, 7.2 g of dipentaerythritol monohydroxypentaacrylate and 300 g of ethanol were mixed and stirred. The PEDOT-PSS aqueous solution containing platinum ions was then added to the resulting solution followed by stirring to obtain a conductive polymer solution C1. A conductive coating film was then formed and evaluated in the same manner as Metal Ion Example 1 with the exception of using the conductive polymer solution C1 instead of the conductive polymer solution A1. The evaluation results are shown in Table 1.

Silver Halide Example 3

6 g of silver bromide (in which the amount of silver that composed the silver bromide was 47.6% by weight based on a value of 100% by weight for the total amount of π-conjugated conductive polymer and polyanion), 0.9 g of Irgacure 127 (Ciba Specialty Chemicals Inc.), 3.6 g of pyrogallol, 18 g of 2-hydroxyethyl acrylamide, 7.2 g of dipentaerythritol hexaacrylate and 300 g of ethanol were mixed and stirred. 600 g of the PEDOT-PSS aqueous solution obtained in Production Example 2 were then added to the resulting mixed solution followed by dispersing with a Nanomizer to obtain a conductive polymer solution C2. A conductive coating film was then formed and evaluated in the same manner as Silver Halide Example 1 with the exception of using the conductive polymer solution C2 instead of the conductive polymer solution A2. The evaluation results are shown in Table 2.

Conductive Carbon Black Example 3

9.0 g of vinylimidazole (2 mol equivalents based on the polyanion) and 0.4 g (0.64% by weight based on a value of 100% by weight for the total amount of the π-conjugated conductive polymer and polyanion) of a paste of Ketjen black (Lion Paste W-356A, Lion Corp., containing cationic surfactant, solid concentration: 11.5% by weight) were added to 600 g of the PEDOT-PSS aqueous solution obtained in Production Example 2 followed by stirring to prepare a PEDOT-PSS aqueous solution containing vinylimidazole and Ketjen black.

Separate from the above, 3.6 g of hydroquinone, 0.9 g of Irgacure 127 (Ciba Specialty Chemicals Inc.), 18 g of 2-hydroxyethylacrylamide, 7.2 g of ethoxified glycerin triacrylate (Shin-Nakamura Chemical Co., Ltd., A-GLY-6E) and 300 g of ethanol were mixed and stirred. The PEDOT-PSS aqueous solution containing vinylimidazole and Ketjen black was then added to the resulting solution followed by dispersing with a Nanomizer to obtain a conductive polymer solution C3. A conductive coating film was then formed and evaluated in the same manner as Conductive Carbon Black Example 1 with the exception of using the conductive polymer solution C3 instead of the conductive polymer solution A3. The evaluation results are shown in Table 3.

Conductive Metal Oxide Particle Example 3

9.0 g of vinylimidazole (2 mol equivalents based on the polyanion) were added to 600 g of the PEDOT-PSS aqueous solution obtained in Production Example 2 followed by stirring to prepare a PEDOT-PSS aqueous solution containing vinylimidazole.

Separate from the above, 3.6 g of ascorbic acid, 1.8 g of tannic acid, 0.9 g of Irgacure 127 (Ciba Specialty Chemicals Inc.), 18 g of 2-hydroxyethylacrylamide, 7.2 g of dipentaerythritol monohydroxypentaacrylate, 300 g of ethanol and 3.5 g (48.6% by weight based on a value of 100% by weight for the total amount of π-conjugated conductive polymer and polyanion) of antimony-doped tin oxide (Ishihara Sangyo Kaisha, Ltd., SN-100P, mean particle diameter: 10 to 30 nm) were mixed and stirred. The PEDOT-PSS aqueous solution containing vinylimidazole was then added to the resulting solution followed by stirring to obtain a conductive polymer solution C4. A conductive coating film was then formed and evaluated in the same manner as Conductive Metal Oxide Particle Example 1 with the exception of using the conductive polymer solution C4 instead of the conductive polymer solution A4. The evaluation results are shown in Table 4.

Metal Ion Example 4

0.5 g of silver acetate (4.4% by weight of silver ions based on a value of 100% by weight for the total amount of π-conjugated conductive polymer and polyanion) were added to 600 g of the PEDOT-PSS aqueous solution obtained in Production Example 2 followed by stirring to prepare a PEDOT-PSS aqueous solution containing silver ions.

Separate from the above, 3.6 g of pyrogallol, 0.9 g of Irgacure 127 (Ciba Specialty Chemicals Inc.), 18 g of 2-hydroxyethylacrylamide, 7.2 g of dipentaerythritol pentaacrylate and 300 g of ethanol were mixed and stirred. The PEDOT-PSS aqueous solution containing silver ions was then added to the resulting solution followed by stirring to obtain a conductive polymer solution D1. A conductive coating film was then formed and evaluated in the same manner as Metal Ion Example 1 with the exception of using the conductive polymer solution D1 instead of the conductive polymer solution A1. The evaluation results are shown in Table 1.

Silver Halide Example 4

0.03 g of silver bromide (in which the amount of silver that composed the silver bromide was 0.24% by weight based on a value of 100% by weight for the total amount of π-conjugated conductive polymer and polyanion), 0.9 g of Irgacure 127 (Ciba Specialty Chemicals Inc.), 3.6 g of 2-hydroxybenzoic acid, 18 g of 2-hydroxyethylacrylamide, 7.2 g of ditrimethylolpropane tetraacrylate and 300 g of ethanol were mixed and stirred. 600 g of the PEDOT-PSS aqueous solution obtained in Production Example 2 were then added to the resulting mixed solution followed by dispersing with a Nanomizer to obtain a conductive polymer solution D2. A conductive coating film was then formed and evaluated in the same manner as Silver Halide Example 1 with the exception of using the conductive polymer solution D2 instead of the conductive polymer solution A2. The evaluation results are shown in Table 2.

Conductive Carbon Black Example 4

9.0 g of tetraammonium hydroxide (1.1 mol equivalents based on the polyanion) were added to 600 g of the PEDOT-PSS aqueous solution obtained in Production Example 2 followed by stirring to prepare a PEDOT-PSS aqueous solution containing tetraammonium hydroxide.

In addition, 20 g of conductive Ketjen black powder (Lion Corp., Carbon ECP), 50 g of sodium dodecylbenzene sulfonate, 200 g of diethylene glycol and 1000 g of ion exchange water were mixed and stirred using an ultrasonic vibrator (Arex Corp., Neonenic high-powered ultrasonic cleaner) to prepare a second prepared liquid.

In addition, 3.6 g of pyrogallol, 0.9 g of Irgacure 127 (Ciba Specialty Chemicals Inc.), 18 g of 2-hydroxyethylacrylamide, 7.2 g of dipentaerythritol pentaacrylate and 300 g of ethanol were mixed and stirred to obtain a third prepared liquid.

0.125 g of the second prepared liquid (in which the amount of carbon black was 0.023% by weight based on the π-conjugated conductive polymer and polyanion) were added to the PEDOT-PSS aqueous solution containing tetraammonium hydroxide and stirred, followed by adding the third prepared liquid and dispersing with a Nanomizer (Yoshida Kikai Co., Ltd.) to obtain a conductive polymer solution D3. A conductive coating film was then formed and evaluated in the same manner as Conductive Carbon Black Example 1 with the exception of using the conductive polymer solution D3 instead of the conductive polymer solution A3. The evaluation results are shown in Table 3.

Conductive Metal Oxide Particle Example 4

9.0 g of tetraammonium hydroxide (1.1 mol equivalents based on the polyanion) were added to 600 g of the PEDOT-PSS aqueous solution obtained in Production Example 2 followed by stirring to prepare a PEDOT-PSS aqueous solution containing tetraammonium hydroxide.

Separate from the above, 3.6 g of pyrogallol, 0.9 g of Irgacure 127 (Ciba Specialty Chemicals Inc.), 18 g of 2-hydroxyethylacrylamide, 7.2 g of dipentaerythritol pentaacrylate, 300 g of ethanol and 0.001 g (0.014% by weight based on a value of 100% by weight for the total amount of π-conjugated conductive polymer and polyanion) of tin-doped indium oxide (Sumitomo Metal Mining Co., Ltd., X500 Series, mean particle diameter: 100 to 140 nm) were mixed and stirred. The PEDOT-PSS aqueous solution containing tetraammonium hydroxide was then added to the resulting solution followed by stirring to obtain a conductive polymer solution D4. A conductive coating film was then formed and evaluated in the same manner as Conductive Metal Oxide Particle Example 1 with the exception of using the conductive polymer solution D4 instead of the conductive polymer solution A4. The evaluation results are shown in Table 4.

Metal Ion Example 5

3 g of silver salicylate (28.9% by weight of silver ions based on a value of 100% by weight for the total amount of π-conjugated conductive polymer and polyanion) were added to 600 g of the PEDOT-PSS aqueous solution obtained in Production Example 2 followed by stirring to prepare a PEDOT-PSS aqueous solution containing silver ions.

Separate from the above, 8.6 g of tannic acid, 0.9 g of Irgacure 127 (Ciba Specialty Chemicals Inc.), 18 g of 2-hydroxyethylacrylamide, 7.2 g of dipentaerythritol pentaacrylate and 300 g of ethanol were mixed and stirred. The PEDOT-PSS aqueous solution containing silver ions was then added to the resulting solution followed by stirring to obtain a conductive polymer solution E1. A conductive coating film was then formed and evaluated in the same manner as Metal Ion Example 1 with the exception of using the conductive polymer solution E1 instead of the conductive polymer solution A1. The evaluation results are shown in Table 1.

Silver Halide Example 5

0.0003 g of silver chloride (in which the amount of silver that composed the silver bromide was 0.005% by weight based on a value of 100% by weight for the total amount of π-conjugated conductive polymer and polyanion), 0.9 g of Irgacure 127 (Ciba Specialty Chemicals Inc.), 1.4 g of ascorbic acid, 2.4 g of methyl gallate, 18 g of 2-hydroxyethylacrylamide, 7.2 g of ethoxified glycerin triacrylate (Shin-Nakamura Chemical Co., Ltd., A-GLY-6E) and 300 g of ethanol were mixed and stirred. 600 g of the PEDOT-PSS aqueous solution obtained in Production Example 2 were then added to the resulting mixed solution followed by dispersing with a Nanomizer to obtain a conductive polymer solution E2. A conductive coating film was then formed and evaluated in the same manner as Silver Halide Example 1 with the exception of using the conductive polymer solution E2 instead of the conductive polymer solution A2. The evaluation results are shown in Table 2.

Conductive Carbon Black Example 5

200 g of conductive Ketjen black powder (Lion Corp., Carbon EC300J), 300 g of sodium dodecylbenzene sulfonate and 1000 g of ion exchange water were mixed and dispersed using an ultrasonic homogenizer to prepare a first prepared liquid.
Separate from the above, 7.2 g of tannic acid, 0.9 g of Irgacure 127 (Ciba Specialty Chemicals Inc.), 18 g of 2-hydroxyethylacrylamide, 7.2 g of tripropylene glycol diacrylate and 300 g of ethanol were mixed and stirred to obtain a second prepared liquid.
2.2 g of the first preparation liquid (0.42% by weight of conductive carbon black based on the π-conjugated conductive polymer and polyanion) were added to 600 g of the PEDOT-PSS aqueous solution obtained in Production Example 2 and stirred, followed by adding the second prepared liquid and dispersing with a Nanomizer (Yoshida Kikai Co., Ltd.) to obtain a conductive polymer solution E3. A conductive coating film was then formed and evaluated in the same manner as Conductive Carbon Black Example 1 with the exception of using the conductive polymer solution E3 instead of the conductive polymer solution A3. The evaluation results are shown in Table 3.

Conductive Metal Oxide Particle Example 5

20.1 g of imidazole (2 mol equivalents based on the polyanion) were added to 600 g of the PEDOT-PSS aqueous solution obtained in Production Example 2 followed by stirring to prepare a PEDOT-PSS aqueous solution containing imidazole.
Separate from the above, 8.6 g of tannic acid, 0.9 g of Irgacure 127 (Ciba Specialty Chemicals Inc.), 18 g of 2-hydroxyethylacrylamide, 7.2 g of dipentaerythritol hexaacrylate, 300 g of ethanol and 0.03 g (0.42% by weight based on a value of 100% by weight for the total amount of π-conjugated conductive polymer and polyanion) of gallium-doped zinc oxide (Hakusuitech Ltd., Pazet, mean particle diameter: 20 to 40 nm) were mixed and stirred. The PEDOT-PSS aqueous solution containing imidazole was then added to the resulting solution followed by stirring to obtain a conductive polymer solution E4. A conductive coating film was then formed and evaluated in the same manner as Conductive Metal Oxide Particle Example 1 with the exception of using the conductive polymer solution E4 instead of the conductive polymer solution A4. The evaluation results are shown in Table 4.

Metal Ion Example 6

5 g of silver sulfate (49.5% by weight of silver ions based on a value of 100% by weight for the total amount of π-conjugated conductive polymer and polyanion) were added to 600 g of the PEDOT-PSS aqueous solution obtained in Production Example 2 followed by stirring to prepare a PEDOT-PSS aqueous solution containing silver ions.
Separate from the above, 12.6 g of methyl 3,4,5-hydroxybenzoate, 0.9 g of Irgacure 127 (Ciba Specialty Chemicals Inc.), 18 g of 2-hydroxyethylacrylamide, 7.2 g of ethoxified glycerin triacrylate (Shin-Nakamura Chemical Co., Ltd., A-GLY-6E) and 300 g of ethanol were mixed and stirred. The PEDOT-PSS aqueous solution containing silver ions was then added to the resulting solution followed by stirring to obtain a conductive polymer solution F1. A conductive coating film was then formed and evaluated in the same manner as Metal Ion Example 1 with the exception of using the conductive polymer solution F1 instead of the conductive polymer solution A1. The evaluation results are shown in Table 1.

Silver Halide Example 6

A conductive polymer solution F2 was obtained in the same manner as Example 1 with the exception of changing the amount of hydroquinone added in Example 1 to 0.036 g. A conductive coating film was formed and evaluated in the same manner as Silver Halide Example 1 with the exception of using the conductive polymer solution F2 instead of the conductive polymer solution A2 and changing the hot air drying conditions to 5 minutes at 120° C. The evaluation results are shown in Table 2.

Conductive Carbon Black Example 6

A conductive polymer solution F3 was obtained in the same manner as Example 1 with the exception of not adding dipentaerythritol hexaacrylate in Example 1. A conductive coating film was then formed and evaluated in the same manner as Conductive Carbon Black Example 1 with the exception of using the conductive polymer solution F3 instead of the conductive polymer solution A3. The evaluation results are shown in Table 3.

Conductive Metal Oxide Particle Example 6

A conductive polymer solution F4 was obtained in the same manner as Example 5 with the exception of not adding dipentaerythritol hexaacrylate in Example 5. A conductive coating film was then formed and evaluated in the same manner as Conductive Metal Oxide Particle Example 1 with the exception of using the conductive polymer solution F4 instead of the conductive polymer solution A4. The evaluation results are shown in Table 4.

Metal Ion Example 7

A conductive polymer solution G1 was obtained in the same manner as Example 1 with the exception of adding 20 g of dimethylsulfoxide instead of the 2-hydroxydiethylacrylamide in Example 1 and not adding pentaerythritol triacrylate. A conductive coating film was then formed and evaluated in the same manner as Metal Ion Example 1 with the exception of using the conductive polymer solution G1 instead of the conductive polymer solution A1. The evaluation results are shown in Table 1.

Silver Halide Example 7

A conductive polymer solution G2 was obtained in the same manner as Silver Halide Example 2 with the exception of not adding 2,3,3',4,4',5'-hexahydroxybenzophenone in Silver Halide Example 2. A conductive coating film was formed and evaluated in the same manner as Silver Halide Example 1 with the exception of using the conductive polymer solution G2 instead of the conductive polymer solution A2 and radiating ultraviolet light (high-pressure mercury lamp, 120 W, 780 mJ/cm$^2$). The evaluation results are shown in Table 2.

Conductive Carbon Black Example 7

A conductive polymer solution G3 was obtained in the same manner as Conductive Carbon Black Example 2 with the exception of adding 20 g of dimethylsulfoxide instead of 2-hydroxyethylacrylamide in Conductive Carbon Black Example 2 and not adding ditrimethylolpropane tetraacrylate. A conductive coating film was then formed and evaluated in the same manner as Conductive Carbon Black Example 1 with the exception of using the conductive polymer solution G3 instead of the conductive polymer solution A3. The evaluation results are shown in Table 3.

Conductive Metal Oxide Particle Example 7

A conductive polymer solution G4 was obtained in the same manner as Conductive Metal Oxide Particle Example 1 with the exception of adding 20 g of dimethylsulfoxide instead of 2-hydroxyethylacrylamide in Conductive Metal Oxide Particle Example 1. A conductive coating film was then formed and evaluated in the same manner as Conductive Metal Oxide Particle Example 1 with the exception of using the conductive polymer solution G4 instead of the conductive polymer solution A4. The evaluation results are shown in Table 4.

Metal Ion Example 8

A conductive polymer solution H1 was obtained in the same manner as Metal Ion Example 3 with the exception of not adding dipentaerythritol monohydroxypentaacrylate in Metal Ion Example 3. A conductive coating film was then formed and evaluated in the same manner as Metal Ion Example 1 with the exception of using the conductive polymer solution H1 instead of the conductive polymer solution A1. The evaluation results are shown in Table 1.

Silver Halide Example 8

A conductive polymer solution H2 was obtained in the same manner as Silver Halide Example 1 with the exception of adding 20 g of dimethylsulfoxide instead of 2-hydroxyethylacrylamide and not adding pentaerythritol triacrylate in Silver Halide Example 1. A conductive coating film was formed and evaluated in the same manner as Silver Halide Example 1 with the exception of using the conductive polymer solution H2 instead of the conductive polymer solution A2. The evaluation results are shown in Table 2.

Conductive Carbon Black Example 8

A conductive coating film was formed and evaluated in the same manner as Example 1 with the exception of changing the ultraviolet light radiation conditions in Example 1 to the use of a 100 W high-pressure mercury lamp at 360 mJ/cm$^2$ and 89 mW/cm$^2$. The evaluation results are shown in Table 3.

Conductive Metal Oxide Particle Example 8

A conductive polymer solution H4 was obtained in the same manner as Conductive Metal Oxide Particle Example 2 with the exception of not adding ditrimethylolpropane tetraacrylate in Conductive Metal Oxide Particle Example 2. A conductive coating film was then formed and evaluated in the same manner as Conductive Metal Oxide Particle Example 1 with the exception of using the conductive polymer solution H4 instead of the conductive polymer solution A4. The evaluation results are shown in Table 4.

Metal Ion Example 9

A conductive polymer solution I1 was obtained in the same manner as Metal Ion Example 5 with the exception of changing the amount of dipentaerythritol hexaacrylate added in Metal Ion Example 5 to 0.72 g. A conductive coating film was then formed and evaluated in the same manner as Metal Ion Example 1 with the exception of using the conductive polymer solution I1 instead of the conductive polymer solution A1. The evaluation results are shown in Table 1.

Silver Halide Example 9

A conductive polymer solution I2 was obtained in the same manner as Silver Halide Example 3 with the exception of not adding dipentaerythritol hexaacrylate in Silver Halide Example 3. A conductive coating film was formed and evaluated in the same manner as Silver Halide Example 1 with the exception of using the conductive polymer solution I2 instead of the conductive polymer solution A2. The evaluation results are shown in Table 2.

Conductive Metal Oxide Particle Example 9

A conductive polymer solution I4 was obtained in the same manner as Conductive Metal Oxide Particle Example 3 with the exception of changing the amount of dipentaerythritol monohydroxypentaacrylate added in Conductive Metal Oxide Particle Example 3 to 0.72 g. A conductive coating film was then formed and evaluated in the same manner as Conductive Metal Oxide Particle Example 1 with the exception of using the conductive polymer solution I4 instead of the conductive polymer solution A4. The evaluation results are shown in Table 4.

Metal Ion Example 10

1.0 g of silver acetate (8.8% by weight of silver ions based on a value of 100% by weight for the total amount of π-conjugated conductive polymer and polyanion) were added to 600 g of the PEDOT-PSS aqueous solution obtained in Production Example 2 followed by stirring to prepare a PEDOT-PSS aqueous solution containing silver ions.

Separate from the above, 7.2 g of 2,3,3',4,4',5'-hexahydroxybenzophenone, 0.9 g of Irgacure 127 (Ciba Specialty Chemicals Inc.), 18 g of 2-hydroxyethylacrylamide, 7.2 g of pentaerythritol triacrylate and 300 g of ethanol were mixed and stirred to obtain a conductive polymer solution J1. A conductive coating film was then formed and evaluated in the same manner as Metal Ion Example 1 with the exception of using the conductive polymer solution J1 instead of the conductive polymer solution A1. The evaluation results are shown in Table 1.

Silver Halide Example 10

A conductive polymer solution J2 was obtained in the same manner as Silver Halide Example 2 with the exception of changing the amount of tripropylene glycol diacrylate added in Silver Halide Example 2 to 0.72 g. A conductive coating film was formed and evaluated in the same manner as Silver Halide Example 1 with the exception of using the conductive polymer solution J2 instead of the conductive polymer solution A2. The evaluation results are shown in Table 2.

Conductive Metal Oxide Particle Example 10

A conductive coating film was formed and evaluated in the same manner as Conductive Metal Oxide Particle Example 1 with the exception of changing the ultraviolet light radiation conditions in Conductive Metal Oxide Particle Example 1 to the use of a 100 W high-pressure mercury lamp at 360 mJ/cm$^2$ and 89 mW/cm$^2$. The evaluation results are shown in Table 4.

Metal Ion Example 11

1.72 g of silver p-toluenesulfonate (6.88% by weight of silver ions based on a value of 100% by weight for the total amount of π-conjugated conductive polymer and polyanion) were added to 600 g of the PEDOT-PSS aqueous solution obtained in Production Example 2 followed by stirring to prepare a PEDOT-PSS aqueous solution containing silver ions.
Separate from the above, 7.2 g of 2,3,3',4,4',5'-hexahydroxybenzophenone, 0.9 g of Irgacure 127 (Ciba Specialty Chemicals Inc.), 18 g of 2-hydroxyethylacrylamide, 7.2 g of pentaerythritol triacrylate and 300 g of ethanol were mixed and stirred. The PEDOT-PSS aqueous solution containing silver ions was added to the resulting solution followed by stirring to obtain a conductive polymer solution K1. A conductive coating film was then formed and evaluated in the same manner as Metal Ion Example 1 with the exception of using the conductive polymer solution K1 instead of the conductive polymer solution A1. The evaluation results are shown in Table 1.

Silver Halide Example 11

A conductive coating film was formed and evaluated in the same manner as Example 1 with the exception of changing the ultraviolet light radiation conditions in Example 1 to the use of a 100 W high-pressure mercury lamp at 360 mJ/cm$^2$ and 89 mW/cm$^2$. The evaluation results are shown in Table 2.

Metal Ion Example 12

1.5 g of silver salicylate (14.5% by weight of silver ions based on a value of 100% by weight for the total amount of π-conjugated conductive polymer and polyanion) were added to 600 g of the PEDOT-PSS aqueous solution obtained in Production Example 2 followed by stirring to prepare a PEDOT-PSS aqueous solution containing silver ions.
Separate from the above, 10.8 g of 2,3,3',4,4',5'-hexahydroxybenzophenone, 0.9 g of Irgacure 127 (Ciba Specialty Chemicals Inc.), 18 g of 2-hydroxyethylacrylamide, 7.2 g of pentaerythritol triacrylate and 300 g of ethanol were mixed and stirred. The PEDOT-PSS aqueous solution containing silver ions was added to the resulting solution followed by stirring to obtain a conductive polymer solution L1. A conductive coating film was then formed and evaluated in the same manner as Metal Ion Example 1 with the exception of using the conductive polymer solution L1 instead of the conductive polymer solution A1. The evaluation results are shown in Table 1.

Metal Ion Example 13

A conductive coating film was formed and evaluated in the same manner as Metal Ion Example 1 with the exception of changing the ultraviolet light radiation conditions in Example 1 to the use of a 100 W high-pressure mercury lamp at 360 mJ/cm$^2$ and 89 mW/cm$^2$. The evaluation results are shown in Table 1.

Metal Ion Example 14

A conductive polymer solution M1 was obtained in the same manner as Metal Ion Example 10 with the exception of using 3 g of chloroauric acid (20% by weight of gold ions based on a value of 100% for the total amount of π-conjugated conductive polymer and polyanion) instead of silver acetate in Metal Ion Example 10. A conductive coating film was then formed and evaluated in the same manner as Metal Ion Example 1 with the exception of using the conductive polymer solution M1 instead of the conductive polymer solution A1. The evaluation results are shown in Table 1.

Metal Ion Example 15

A conductive polymer solution N1 was obtained in the same manner as Metal Ion Example 11 with the exception of using 2 g of a 5% by weight nitric acid solution of palladium nitrate (0.96% by weight of palladium ions based on a value of 100% for the total amount of π-conjugated conductive polymer and polyanion) instead of silver p-toluenesulfonate in Metal Ion Example 11. A conductive coating film was then formed and evaluated in the same manner as Metal Ion Example 1 with the exception of using the conductive polymer solution N1 instead of the conductive polymer solution A1. The evaluation results are shown in Table 1.

Metal Ion Example 16

0.34 g of silver carbonate (3.5% by weight of silver ions based on a value of 100% by weight for the total amount of π-conjugated conductive polymer and polyanion) were added to 600 g of the PEDOT-PSS aqueous solution obtained in Production Example 2 followed by stirring to prepare a PEDOT-PSS aqueous solution containing silver ions.
Separate from the above, 1.8 g of 2,3,3',4,4',5'-hexahydroxybenzophenone, 0.9 g of Irgacure 127 (Ciba Specialty Chemicals Inc.), 18 g of 2-hydroxyethylacrylamide, 7.2 g of pentaerythritol triacrylate and 300 g of ethanol were mixed and stirred. The PEDOT-PSS aqueous solution containing silver ions was added to the resulting solution followed by stirring to obtain a conductive polymer solution O1. A conductive coating film was then formed and evaluated in the same manner as Metal Ion Example 1 with the exception of using the conductive polymer solution O1 instead of the conductive polymer solution A1. The evaluation results are shown in Table 1.

Metal Ion Example 17

0.68 g of silver carbonate (7.0% by weight of silver ions based on a value of 100% for the total amount of π-conjugated conductive polymer and polyanion) were added to 600 g of the PEDOT-PSS aqueous solution obtained in Production Example 2 followed by stirring to prepare a PEDOT-PSS aqueous solution containing silver ions.

Separate from the above, 1.8 g of pyrogallol, 0.9 g of Irgacure 127 (Ciba Specialty Chemicals Inc.), 18 g of 2-hydroxyethylacrylamide, 7.2 g of ditrimethylolpropane tetraacrylate and 300 g of ethanol were mixed and stirred. The PEDOT-PSS aqueous solution containing silver ions was added to the resulting solution followed by stirring to obtain a conductive polymer solution P1. A conductive coating film was then formed and evaluated in the same manner as Metal Ion Example 1 with the exception of using the conductive polymer solution P1 instead of the conductive polymer solution A1. The evaluation results are shown in Table 1.

Metal Ion Example 18

0.08 g of silver carbonate (0.8% by weight of silver ions based on a value of 100% by weight for the total amount of π-conjugated conductive polymer and polyanion) were added to 600 g of the PEDOT-PSS aqueous solution obtained in Production Example 2 followed by stirring to prepare a PEDOT-PSS aqueous solution containing silver ions.

Separate from the above, 1.8 g of methyl 3,4,5-hydroxybenzoate, 0.9 g of Irgacure 127 (Ciba Specialty Chemicals Inc.), 18 g of 2-hydroxyethylacrylamide, 7.2 g of dipentaerythritol pentaacrylate and 300 g of ethanol were mixed and stirred. The PEDOT-PSS aqueous solution containing silver ions was added to the resulting solution followed by stirring to obtain a conductive polymer solution Q1. A conductive coating film was then formed and evaluated in the same manner as Metal Ion Example 1 with the exception of using the conductive polymer solution Q1 instead of the conductive polymer solution A1. The evaluation results are shown in Table 1.

Metal Ion Comparative Example 1

A conductive polymer solution R1 was obtained in the same manner as Metal Ion Example 1 with the exception of not adding silver p-toluenesulfonate in Metal Ion Example 1. A conductive coating film was then formed and evaluated in the same manner as Example 1 with the exception of using the conductive polymer solution R1 instead of the conductive polymer solution A1. The evaluation results are shown in Table 1.

Silver Halide Comparative Example 1

A conductive polymer solution K2 was obtained in the same manner as Silver Halide Example 2 with the exception of changing the amount of silver chloride added in Silver Halide Example 2 to 5 g (in which the amount of silver that composed the silver chloride was 52.7% by weight based on a value of 100% by weight for the total amount of π-conjugated conductive polymer and polyanion). A conductive coating film was formed and evaluated in the same manner as Silver Halide Example 1 with the exception of using the conductive polymer solution K2 instead of the conductive polymer solution A2. The evaluation results are shown in Table 2.

Conductive Carbon Black Comparative Example 1

A conductive polymer solution H3 was obtained in the same manner as Conductive Carbon Black Example 1 with the exception of changing the amount of Ketjen black paste added in Conductive Carbon Black Example 3 to 0.004 g (0.0064% by weight of conductive carbon black based on a value of 100% by weight for the total amount of π-conjugated conductive polymer and polyanion). A conductive coating film was then formed and evaluated in the same manner as Conductive Carbon Black Example 1 with the exception of using the conductive polymer solution H3 instead of the conductive polymer solution A3. The evaluation results are shown in Table 3.

Conductive Metal Oxide Particle Comparative Example 1

A conductive polymer solution J4 was obtained in the same manner as Conductive Metal Oxide Particle Example 1 with the exception of not adding imidazole in Conductive Metal Oxide Particle Example 1. A conductive coating film was then formed and evaluated in the same manner as Conductive Metal Oxide Particle Example 1 with the exception of using the conductive polymer solution J4 instead of the conductive polymer solution A4. The evaluation results are shown in Table 4.

Metal Ion Comparative Example 2

A conductive polymer solution S1 was obtained in the same manner as Metal Ion Example 2 with the exception of not adding 2,3,3',4,4',5'-hexahydroxybenzophenone in Metal Ion Example 2. A conductive coating film was then formed and evaluated in the same manner as Metal Ion Example 1 with the exception of using the conductive polymer solution S1 instead of the conductive polymer solution A1. The evaluation results are shown in Table 1.

Silver Halide Comparative Example 2

A conductive polymer solution L2 was obtained in the same manner as Silver Halide Example 3 with the exception of changing the amount of silver bromide added in Silver Halide Example 3 to 0.0001 g (in which the amount of silver that composed the silver chloride was 0.0007% by weight based on a value of 100% by weight for the total amount of π-conjugated conductive polymer and polyanion). A conductive coating film was formed and evaluated in the same manner as Silver Halide Example 1 with the exception of using the conductive polymer solution L2 instead of the conductive polymer solution A2. The evaluation results are shown in Table 2.

Conductive Carbon Black Comparative Example 2

A conductive polymer solution I3 was obtained in the same manner as Conductive Carbon Black Example 4 with the exception of changing the amount of the second prepared liquid added in Conductive Carbon Black Example 4 to 4 g (11.1% by weight of conductive carbon black based on a value of 100% by weight for the total amount of π-conjugated conductive polymer and polyanion). A conductive coating film was then formed and evaluated in the same manner as Conductive Carbon Black Example 1 with the exception of using the conductive polymer solution I3 instead of the conductive polymer solution A3. The evaluation results are shown in Table 3.

Conductive Metal Oxide Particle Comparative Example 2

A conductive polymer solution K4 was obtained in the same manner as Conductive Metal Oxide Particle Example 3 with the exception of changing the amount of antimony-doped tin oxide added in Conductive Metal Oxide Particle Example 3 to 0.0005 g (0.0069% by weight based on a value of 100% by weight for the total amount of π-conjugated conductive polymer and polyanion). A conductive coating film was then formed and evaluated in the same manner as Conductive Metal Oxide Particle Example 1 with the exception of using the conductive polymer solution K4 instead of the conductive polymer solution A4. The evaluation results are shown in Table 4.

Metal Ion Comparative Example 3

A conductive polymer solution T1 was obtained in the same manner as Metal Ion Example 3 with the exception of changing the amount of chloroplatinic acid added in Metal Ion Example 3 to 0.0001 g (0.00083% by weight of silver ions based on a value of 100% by weight for the total amount of π-conjugated conductive polymer and polyanion). A conductive coating film was then formed and evaluated in the same manner as Metal Ion Example 1 with the exception of using the conductive polymer solution T1 instead of the conductive polymer solution A1. The evaluation results are shown in Table 1.

Silver Halide Comparative Example 3

A conductive polymer solution M2 was obtained in the same manner as Silver Halide Example 1 with the exception of not adding silver chloride in Silver Halide Example 1. A conductive coating film was formed and evaluated in the same manner as Silver Halide Example 1 with the exception of using the conductive polymer solution M2 instead of the conductive polymer solution A2. The evaluation results are shown in Table 2.

Conductive Metal Oxide Particle Comparative Example 3

A conductive polymer solution L4 was obtained in the same manner as Conductive Metal Oxide Particle Example 4 with the exception of changing the amount of tin-doped indium oxide added in Conductive Metal Oxide Particle Example 4 to 4 g (55.6% by weight based on a value of 100% by weight for the total amount of π-conjugated conductive polymer and polyanion). A conductive coating film was then formed and evaluated in the same manner as Conductive Metal Oxide Particle Example 1 with the exception of using the conductive polymer solution L4 instead of the conductive polymer solution A4. The evaluation results are shown in Table 4.

Metal Ion Comparative Example 4

A conductive polymer solution U1 was obtained in the same manner as Metal Ion Example 4 with the exception of changing the amount of silver acetate added in Metal Ion Example 4 to 6 g (52.5% by weight of silver ions based on a value of 100% by weight for the total amount of π-conjugated conductive polymer and polyanion). A conductive coating film was then formed and evaluated in the same manner as Metal Ion Example 1 with the exception of using the conductive polymer solution U1 instead of the conductive polymer solution A1. The evaluation results are shown in Table 1.

Metal Ion Comparative Example 5

A conductive polymer solution V1 was obtained in the same manner as Metal Ion Example 10 with the exception of using 1 g of aluminum chloride (2.8% by weight of aluminum ions based on a value of 100% by weight for the total amount of π-conjugated conductive polymer and polyanion) instead of silver acetate in Metal Ion Example 10. A conductive coating film was then formed and evaluated in the same manner as Metal Ion Example 1 with the exception of using the conductive polymer solution V1 instead of the conductive polymer solution A1. The evaluation results are shown in Table 1.

Metal Ion Comparative Example 6

A conductive polymer solution W1 was obtained in the same manner as Metal Ion Example 11 with the exception of using 1 g of sodium chloride (5.5% by weight of sodium ions based on a value of 100% by weight for the total amount of π-conjugated conductive polymer and polyanion) instead of silver salicylate in Metal Ion Example 11. A conductive coating film was then formed and evaluated in the same manner as Metal Ion Example 1 with the exception of using the conductive polymer solution W1 instead of the conductive polymer solution A1. The evaluation results are shown in Table 1.

Each of the conductive polymer solutions of Metal Ion Examples 1 to 18 containing a π-conjugated conductive polymer, polyanion, specific metal ions and reducing agent, the conductive polymer solutions of Silver Halide Examples 1 to 10 containing a π-conjugated conductive polymer, polyanion and silver halide, the conductive polymer solutions of Conductive Carbon Black Examples 1 to 7 containing a π-conjugated conductive polymer, polyanion and conductive carbon black, and the conductive polymer solutions of Conductive Metal Oxide Particle Examples 1 to 9 containing a π-conjugated conductive polymer, polyanion, conductive metal oxide particles and neutralizing agent demonstrated superior electrical conductivity and transparency and allowed the formation of conductive coating films having low contact resistance with respect to an ITO film.

Moreover, since the conductive polymer solutions of Metal Ion Examples 1 to 6, 9 to 12 and 14 to 18 contained a polyfunctional acrylic compound, conductive coating films obtained there from demonstrated superior film strength, superior adhesion of the conductive coating film to a transparent base and superior adhesion of metal particles.

Since the conductive polymer solutions of Silver Halide Examples 1 to 6, 9 and 10 contained a (meth)acrylamide compound and an aromatic compound having two or more hydroxy groups, conductive coating films obtained there from demonstrated even more superior electrical conductivity and lower contact resistance.

Since the conductive polymer solutions of Conductive Carbon Black Examples 1 to 5 contained a polyfunctional acrylic compound, conductive coating films obtained there from demonstrated superior film strength, superior adhesion of the conductive coating film to a transparent base and superior adhesion of conductive carbon black.

Since the conductive polymer solutions of Conductive Metal Oxide Particle Examples 1 to 6, 8 and 9 contained a (meth)acrylamide compound, conductive coating films obtained there from demonstrated even more superior electrical conductivity.

Furthermore, although each of the conductive polymer solutions of Metal Ion Example 13, Silver Halide Example 11, Conductive Carbon Black Example 8 and Conductive Metal Oxide Particle Examples 1 to 5 contained a polyfunctional acrylic compound, film strength was low due to illuminance of ultraviolet light during coating film formation being less than 100 mW/cm².

In addition, since the conductive polymer solutions of Metal Ion Examples 1 to 6 and 8 to 18 contained a (meth) acrylamide compound, conductive coating films obtained there from demonstrated even more superior electrical conductivity.

Moreover, since the conductive polymer solutions of Silver Halide Examples 1 to 7 and 10 contained a polyfunctional acrylic compound, conductive coating films obtained there from demonstrated superior film strength, superior adhesion of the conductive coating film to a transparent base, and superior adhesion of silver particles.

Since the conductive polymer solutions of Conductive Metal Oxide Particle Examples 1 to 5 contained a polyfunctional acrylic compound, conductive coating films obtained there from demonstrated superior film strength, superior adhesion of the conductive coating film to a transparent base, and superior adhesion of the conductive metal oxide particles.

In the conductive coating films formed by conductive polymer solutions of Metal Ion Comparative Example 1, which contained a π-conjugated conductive polymer, polyanion and reducing agent but did not contain specific metal ions, and Conductive Carbon Black Comparative Example 1, which contained a π-conjugated conductive polymer, polyanion and conductive carbon black but in which the amount of conductive carbon black added was less than 0.01% by weight, contact resistance with respect to an ITO film increased making these unsuitable for use in input devices.

In the conductive coating film formed by the conductive polymer solution of Silver Halide Comparative Example 1, which contained a π-conjugated conductive polymer, polyanion and silver halide, but in which the amount of silver that composed the silver halide exceeded 50% by weight, adequate transparency was not obtained, thereby making it unsuitable for use in input devices.

In the conductive coating film formed by the conductive polymer solution of Conductive Metal Oxide Particle Comparative Example 1, to which a neutralizing agent was not added, contact resistance with respect to an ITO film increased, thereby making it unsuitable for use in input devices.

In the conductive coating films formed by the conductive polymer solutions of Metal Ion Comparative Example 2, which contained a π-conjugated conductive polymer, polyanion and specific metal ions, but did not contain a reducing agent, Silver Halide Comparative Example 2, which contained a π-conjugated conductive polymer, polyanion and silver halide but in which the amount of silver that composed the silver halide was less than 0.001% by weight, and Conductive Metal Oxide Particle Comparative Example 2, which contained π-conjugated conductive polymer, polyanion, conductive metal oxide particles and neutralizing agent but in which the amount of metal oxide conductive particles added was less than 0.01% by weight, contact resistance with respect to an ITO film increased, thereby making these unsuitable for use in input devices.

In the conductive coating film formed by the conductive polymer solution of Conductive Carbon Black Comparative Example 2, which contained alt-conjugated conductive polymer, polyanion and conductive carbon black but in which the amount of conductive carbon black added exceeded 10% by weight, adequate transparency was not obtained, thereby making it unsuitable for use in input devices.

In the conductive coating films formed by the conductive polymer solutions of Metal Ion Comparative Example 3, which contained a π-conjugated conductive polymer, polyanion, specific metal ions and a reducing agent but in which the content of metal ions was less than 0.001% by weight, and Silver Halide Comparative Example 3, which contained a π-conjugated conductive polymer and polyanion but did not contain silver halide, contact resistance with respect to an ITO film increased, thereby making these unsuitable for use in input devices.

In the conductive coating film formed by the conductive polymer solution of Conductive Metal Oxide Particle Comparative Example 3, which contained a π-conjugated conductive polymer, polyanion, conductive metal oxide particles and a neutralizing agent but in which the amount of conductive metal oxide particles added exceeded 50% by weight, adequate transparency was not obtained, thereby making it unsuitable for use in input devices.

In the conductive coating film formed by the conductive polymer solution of Metal Ion Comparative Example 4, which contained a π-conjugated conductive polymer, polyanion, specific metal ions and a reducing agent but in which the content of metal ions exceeded 50% by weight, adequate transparency was not obtained, thereby making it unsuitable for use in input devices.

In the conductive coating films formed by the conductive polymer solutions of Metal Ion Comparative Examples 5 and 6, which contained a π-conjugated conductive polymer, polyanion and reducing agent and contained metal ions other than specific metal ions instead of the specific metal ions, contact resistance with respect to an ITO film increased, thereby making these unsuitable for use in input devices.

INDUSTRIAL APPLICABILITY

The conductive polymer solution of the present invention can be used a conductive coating film having both superior transparency and being suitable for use a transparent electrode of a touch panel electrode sheet. In addition, the conductive coating film of the present invention has superior transparency that enables it to be used as a transparent electrode of a touch panel electrode sheet.

What is claimed is:

1. An input device, which is provided with a transparent electrode composed of a conductive coating film which is formed by coating a conductive polymer solution, wherein
the conductive polymer solution comprises a π-conjugated conductive polymer, a polyanion, conductive carbon black and a solvent, and wherein
the content of the conductive carbon black is 0.01 to 10% by weight based on a value of 100% for the total amount of the π-conjugated conductive polymer and the polyanion,
the conductive coating film has a light transmittance of at least 78.5%, and
the conductive coating film has a contact resistance of no more than 1410 Ω.

2. The input device according to claim 1, wherein the input device is further provided with an ITO film.

3. The input device according to claim 1, wherein the conductive polymer solution further comprises a surfactant.

4. The input device according to claim 1, wherein the conductive polymer solution further comprises at least one of a (meth)acrylamide compound and a polyfunctional acrylic compound.

5. The input device according to claim 1, wherein the content of the conductive carbon black is 0.01 to 5.0% by weight based on a value of 100% for the total amount of the π-conjugated conductive polymer and the polyanion.

6. The input device according to claim 1, wherein the conductive carbon black has a mean particle diameter of 0.01 to 0.5 μm.

7. The input device according to claim 1, wherein the input device is a touch panel.

8. The input device according to claim 1, wherein the input device is a resistive film type touch panel.

* * * * *